US012414055B2

United States Patent
Ryu et al.

(10) Patent No.: US 12,414,055 B2
(45) Date of Patent: Sep. 9, 2025

(54) TRANSMIT POWER ADJUSTMENT BASED ON INTER-USER EQUIPMENT COORDINATION

(71) Applicant: QUALCOMM Incorporated, San Diego, CA (US)

(72) Inventors: Jung Ho Ryu, Fort Lee, NJ (US); Sony Akkarakaran, Poway, CA (US); Jelena Damnjanovic, Del Mar, CA (US); Hua Wang, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/886,166

(22) Filed: Aug. 11, 2022

(65) Prior Publication Data
US 2024/0056991 A1    Feb. 15, 2024

(51) Int. Cl.
*H04W 52/00* (2009.01)
*H04W 28/26* (2009.01)
(Continued)

(52) U.S. Cl.
CPC ......... *H04W 52/383* (2013.01); *H04W 28/26* (2013.01); *H04W 52/281* (2013.01)

(58) Field of Classification Search
CPC . H04W 52/383; H04W 28/26; H04W 52/281; H04W 72/40; H04W 72/25; H04L 5/003; H04L 5/0091
See application file for complete search history.

(56) References Cited

U.S. PATENT DOCUMENTS

2017/0238260 A1\* 8/2017 Kim ..................... H04L 1/1819
  455/522
2021/0297118 A1\* 9/2021 Kwak .................. H04B 7/0632
(Continued)

FOREIGN PATENT DOCUMENTS

WO  WO-2021185960 A1  9/2021
WO  WO-2022032280 A1  2/2022

OTHER PUBLICATIONS

Huawei, et al., "Inter-UE Coordination in Sidelink Resource Allocation", 3GPP TSG RAN WG1 Meeting #107bis-e, R1-2200042, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, 28 Pages, XP052098113, Sections 3.1.1.1.3 and 3.1.2.
(Continued)

*Primary Examiner* — MD K Talukder
(74) *Attorney, Agent, or Firm* — Holland & Hart LLP/Qualcomm Incorporated

(57) ABSTRACT

Methods, systems, and devices for wireless communications are described. In one aspect, a first user equipment (UE) may transmit an indication of non-preferred resources to a second UE and an indication of an amount of transmit power reduction for the second UE to observe for a sidelink transmission on the non-preferred resources. In another aspect, a first UE may transmit an indication of an amount of transmit power reduction for a second UE to observe for a sidelink transmission on conflicting resources (e.g., resources reserved by the second UE and a third UE). Because the second UE may transmit on the non-preferred resources or the conflicting resources with reduced power (e.g., rather than suppressing transmissions on the non-preferred resources or the conflicting resources), the utili-
(Continued)

zation of the non-preferred resources or the conflicting resources may be improved.

18 Claims, 11 Drawing Sheets

(51) Int. Cl.
  *H04W 52/28* (2009.01)
  *H04W 52/38* (2009.01)

(56) References Cited

U.S. PATENT DOCUMENTS

| | | | |
|---|---|---|---|
| 2022/0046600 A1* | 2/2022 | Hosseini | H04W 72/541 |
| 2023/0081131 A1* | 3/2023 | Selvanesan | H04W 72/20 |
| | | | 370/329 |
| 2023/0319883 A1* | 10/2023 | Elazzouni | H04W 74/0866 |
| | | | 370/329 |
| 2024/0056991 A1* | 2/2024 | Ryu | H04W 52/281 |

OTHER PUBLICATIONS

International Search Report and Written Opinion—PCT/US2023/070343—ISA/EPO—Oct. 20, 2023 (2205412WO).

* cited by examiner

TRANSMIT POWER ADJUSTMENT BASED ON INTER-USER EQUIPMENT COORDINATION

FIELD OF TECHNOLOGY

The following relates to wireless communications, including transmit power adjustment based on inter-user equipment coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support sidelink communications between UEs. In such systems, it may be appropriate for UEs to support inter-UE coordination (IUC) to coordinate communications on sidelink resources (e.g., to avoid interference and collisions). Improved techniques for IUC may be desirable.

SUMMARY

The described techniques relate to improved methods, systems, devices, and apparatuses that support transmit power adjustment based on inter-user equipment (UE) coordination (IUC). In one aspect, when a first UE identifies non-preferred resources for a sidelink transmission from a second UE, the first UE may transmit an indication of the non-preferred resources to the second UE and an indication of an amount of transmit power reduction for the second UE to observe for a sidelink transmission on the non-preferred resources. In another aspect, when a first UE identifies conflicting resources reserved by a second UE and a third UE, the first UE may transmit an indication of an amount of transmit power reduction for the second UE to observe for a sidelink transmission on the conflicting resources. Because the second UE may transmit on the non-preferred resources or the conflicting resources with reduced power (e.g., rather than suppressing transmissions on the non-preferred resources or the conflicting resources), the utilization of the non-preferred resources or the conflicting resources may be improved.

A method for wireless communication at a first UE is described. The method may include receiving, by the first UE, first sidelink control information reserving a first set of resources for a first sidelink transmission by a third UE, transmitting, to a second UE, an inter-UE coordination message indicating a second set of resources and an amount of transmit power reduction for the second UE to observe for a second sidelink transmission by the second UE via the second set of resources, where the second set of resources overlaps with the first set of resources, and receiving the second sidelink transmission from the second UE via the second set of resources in accordance with the indicated amount of transmit power reduction or the first sidelink transmission from the third UE via the first set of resources.

An apparatus for wireless communication is described. The apparatus may include a memory, a transceiver, and at least one processor of a first UE, the at least one processor coupled with the memory and the transceiver. The at least one processor may be configured to receive, by the first UE, first sidelink control information reserving a first set of resources for a first sidelink transmission by a third UE, transmit, to a second UE, an inter-UE coordination message indicating a second set of resources and an amount of transmit power reduction for the second UE to observe for a second sidelink transmission by the second UE via the second set of resources, where the second set of resources overlaps with the first set of resources, and receive the second sidelink transmission from the second UE via the second set of resources in accordance with the indicated amount of transmit power reduction or the first sidelink transmission from the third UE via the first set of resources.

Another apparatus for wireless communication at a first UE is described. The apparatus may include means for receiving, by the first UE, first sidelink control information reserving a first set of resources for a first sidelink transmission by a third UE, means for transmitting, to a second UE, an inter-UE coordination message indicating a second set of resources and an amount of transmit power reduction for the second UE to observe for a second sidelink transmission by the second UE via the second set of resources, where the second set of resources overlaps with the first set of resources, and means for receiving the second sidelink transmission from the second UE via the second set of resources in accordance with the indicated amount of transmit power reduction or the first sidelink transmission from the third UE via the first set of resources.

A non-transitory computer-readable medium storing code for wireless communication at a first UE is described. The code may include instructions executable by a processor to receive, by the first UE, first sidelink control information reserving a first set of resources for a first sidelink transmission by a third UE, transmit, to a second UE, an inter-UE coordination message indicating a second set of resources and an amount of transmit power reduction for the second UE to observe for a second sidelink transmission by the second UE via the second set of resources, where the second set of resources overlaps with the first set of resources, and receive the second sidelink transmission from the second UE via the second set of resources in accordance with the indicated amount of transmit power reduction or the first sidelink transmission from the third UE via the first set of resources.

In some examples of the method, apparatuses, and non-transitory computer-readable medium described herein, transmitting the inter-UE coordination message may include operations, features, means, or instructions for transmitting a resource set type in the inter-UE coordination message, the resource set type indicating that the second set of resources includes non-preferred resources.

In some examples of the method, apparatuses, and non-transitory computer-readable medium described herein, transmitting the inter-UE coordination message may include operations, features, means, or instructions for transmitting an indication that the inter-UE coordination message indicates the amount of transmit power reduction for the second UE to observe for the second sidelink transmission by the second UE via the second set of resources.

In some examples of the method, apparatuses, and non-transitory computer-readable medium described herein, the inter-UE coordination message includes second sidelink control information or a medium access control control element.

Some examples of the method, apparatuses, and non-transitory computer-readable medium described herein may further include operations, features, means, or instructions for determining that a measurement performed on the first sidelink control information from the third UE fails to satisfy a threshold, where transmitting the inter-UE coordination message to the second UE may be based on the measurement failing to satisfy the threshold.

In some examples of the method, apparatuses, and non-transitory computer-readable medium described herein, transmitting the inter-UE coordination message may include operations, features, means, or instructions for transmitting the inter-UE coordination message with a cyclic shift indicating the amount of transmit power reduction for the second UE to observe for the second sidelink transmission by the second UE via the second set of resources.

In some examples of the method, apparatuses, and non-transitory computer-readable medium described herein, the first UE may be configured with a set of multiple cyclic shifts, and a first cyclic shift of the set of multiple cyclic shifts indicates that the second UE may be to avoid transmitting the second sidelink transmission via the second set of resources, and each other cyclic shift of the set of multiple cyclic shifts indicates a different amount of transmit power reduction for the second UE to observe for the second sidelink transmission by the second UE via the second set of resources.

Some examples of the method, apparatuses, and non-transitory computer-readable medium described herein may further include operations, features, means, or instructions for determining to transmit the inter-UE coordination message to the second UE based on the second sidelink transmission being associated with a lower priority than the first sidelink transmission.

Some examples of the method, apparatuses, and non-transitory computer-readable medium described herein may further include operations, features, means, or instructions for receiving, by the first UE, signaling that reserves the second set of resources for the second sidelink transmission by the second UE.

In some examples of the method, apparatuses, and non-transitory computer-readable medium described herein, the first sidelink transmission from the third UE may be intended for the first UE and the method, apparatuses, and non-transitory computer-readable medium may include further operations, features, means, or instructions for determining that a first measurement performed on the signaling exceeds a first threshold or that a difference between the first measurement and a second measurement performed on the first sidelink control information exceeds a second threshold, where transmitting the inter-UE coordination message to the second UE may be based on the determining.

In some examples of the method, apparatuses, and non-transitory computer-readable medium described herein, the second sidelink transmission from the second UE may be intended for the first UE and the method, apparatuses, and non-transitory computer-readable medium may include further operations, features, means, or instructions for determining that a first measurement performed on the first sidelink control information exceeds a first threshold or that a difference between the first measurement and a second measurement performed on the signaling exceeds a second threshold, where transmitting the inter-UE coordination message to the second UE may be based on the determining.

A method for wireless communication at a second UE is described. The method may include receiving, from a first UE, an inter-UE coordination message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE and transmitting the second sidelink transmission via the second set of resources in accordance with the indicated amount of transmit power reduction.

An apparatus for wireless communication is described. The apparatus may include a memory, a transceiver, and at least one processor of a second UE, the at least one processor coupled with the memory and the transceiver. The at least one processor may be configured to receive, from a first UE, an inter-UE coordination message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE and transmit the second sidelink transmission via the second set of resources in accordance with the indicated amount of transmit power reduction.

Another apparatus for wireless communication at a second UE is described. The apparatus may include means for receiving, from a first UE, an inter-UE coordination message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE and means for transmitting the second sidelink transmission via the second set of resources in accordance with the indicated amount of transmit power reduction.

A non-transitory computer-readable medium storing code for wireless communication at a second UE is described. The code may include instructions executable by a processor to receive, from a first UE, an inter-UE coordination message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE and transmit the second sidelink transmission via the second set of resources in accordance with the indicated amount of transmit power reduction.

In some examples of the method, apparatuses, and non-transitory computer-readable medium described herein, receiving the inter-UE coordination message may include operations, features, means, or instructions for receiving a resource set type in the inter-UE coordination message, the resource set type indicating that the second set of resources includes non-preferred resources.

In some examples of the method, apparatuses, and non-transitory computer-readable medium described herein, receiving the inter-UE coordination message may include operations, features, means, or instructions for receiving an indication that the inter-UE coordination message indicates the amount of transmit power reduction for the second UE to observe for the second sidelink transmission by the second UE via the second set of resources.

Some examples of the method, apparatuses, and non-transitory computer-readable medium described herein may further include operations, features, means, or instructions for transmitting, to the first UE, a request for the inter-UE coordination message, where receiving the inter-UE coordination message from the first UE may be based on transmitting the request.

In some examples of the method, apparatuses, and non-transitory computer-readable medium described herein, the inter-UE coordination message includes second sidelink control information or a medium access control control element.

In some examples of the method, apparatuses, and non-transitory computer-readable medium described herein, receiving the inter-UE coordination message may include operations, features, means, or instructions for receiving the inter-UE coordination message with a cyclic shift indicating the amount of transmit power reduction for the second UE to observe for the second sidelink transmission by the second UE via the second set of resources.

In some examples of the method, apparatuses, and non-transitory computer-readable medium described herein, the second sidelink transmission may be associated with a lower priority than the first sidelink transmission and receiving the inter-UE coordination message may be based on the second sidelink transmission being associated with a lower priority than the first sidelink transmission.

Some examples of the method, apparatuses, and non-transitory computer-readable medium described herein may further include operations, features, means, or instructions for transmitting signaling that reserves the second set of resources for the second sidelink transmission by the second UE.

DETAILED DESCRIPTION

Figure 1:
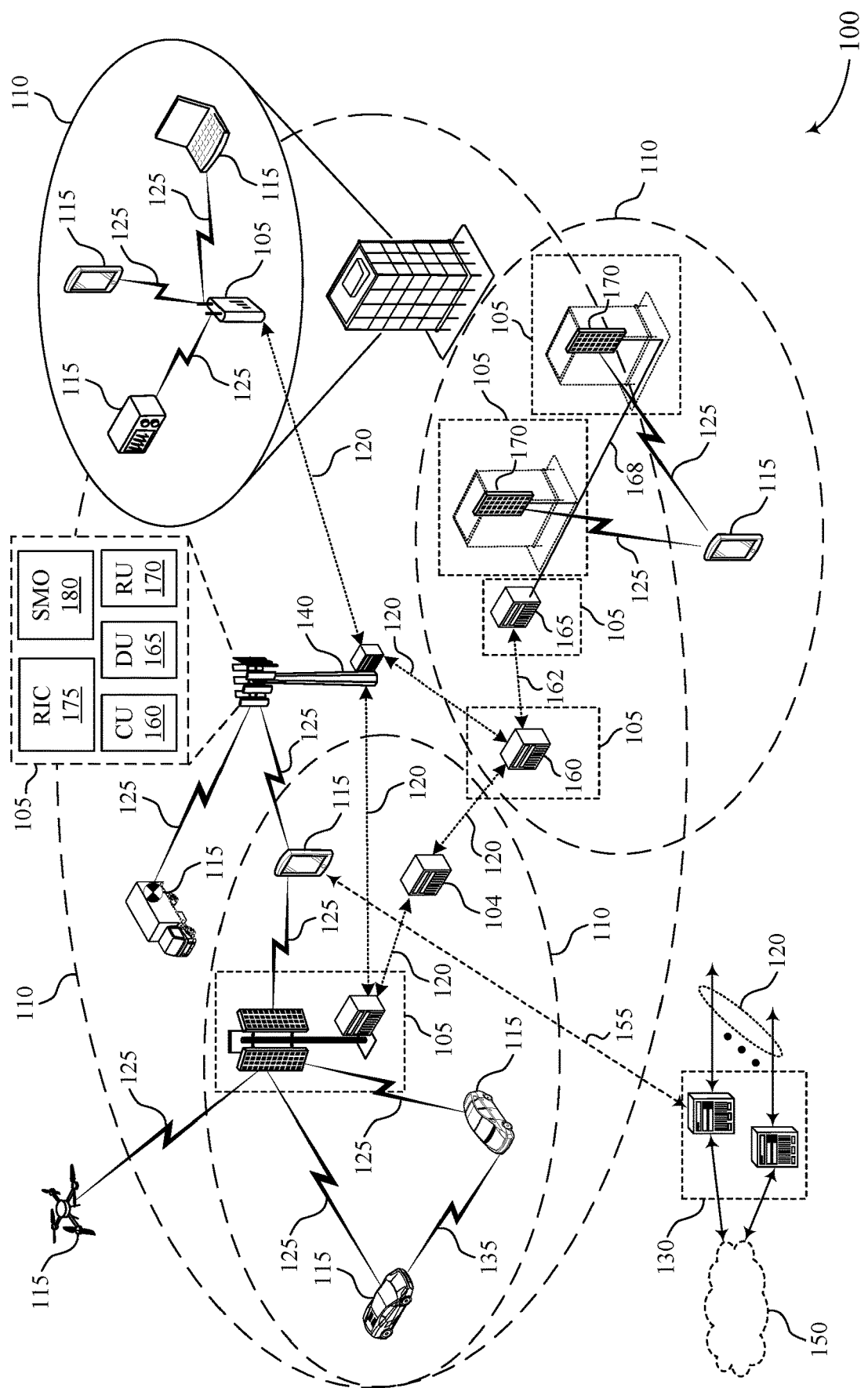
FIG. 1 illustrates an example of a wireless communications system that supports transmit power adjustment based on inter-user equipment (UE) coordination (IUC) in accordance with one or more aspects of the present disclosure.

Some wireless communications systems may support sidelink communications between user equipment (UEs). In such systems, it may be appropriate for UEs to exchange messages to coordinate communications on sidelink resources (e.g., to minimize interference and collisions). Such messages may be referred to as inter-UE coordination (IUC) messages. In one example, if a first UE identifies non-preferred resources for transmissions from a second UE (e.g., based on the non-preferred resources being reserved by a third UE), the first UE may transmit an IUC message to the second UE indicating the non-preferred resources. In another example, if a first UE detects a conflict between a second UE and a third UE (e.g., reservations of the same resources by the second UE and the third UE), the first UE may transmit an IUC message to the second UE indicating conflicting resources between the second UE and the third UE. In either of these examples, the second UE may avoid transmitting on the non-preferred resources or the conflicting resources to avoid interference and collisions. Improved techniques for utilizing non-preferred resources or conflicting resources may be desirable.

The described techniques relate to transmit power adjustment based on IUC to improve the utilization of non-preferred resources, conflicting resources, or other communication resources. In one aspect, when a first UE identifies non-preferred resources for a sidelink transmission from a second UE, the first UE may transmit an indication of the non-preferred resources to the second UE and an indication of an amount of transmit power reduction for the second UE to observe for a sidelink transmission on the non-preferred resources. In another aspect, when a first UE identifies conflicting resources reserved by a second UE and a third UE, the first UE may transmit an indication of an amount of transmit power reduction for the second UE to observe for a sidelink transmission on the conflicting resources.

Thus, a first UE may indicate a set of resources that the first UE would prefer a second UE not transmit on, along with a requested level of power reduction in case the second UE does nevertheless transmit on those resources. The second UE being able to nevertheless transmit on those resources if the second UE reduces its transmit power, potentially, in addition to the first UE indicating the extent of transmit power reduction, may provide one or more benefits. For example, because the second UE may transmit on the non-preferred resources or the conflicting resources with reduced power (e.g., rather than suppressing transmissions on the non-preferred resources or the conflicting resources), the utilization of the non-preferred resources or the conflicting resources may be improved, among other possible benefits.

Aspects of the disclosure are initially described in the context of wireless communications systems. Aspects of the disclosure are further illustrated by and described with reference to apparatus diagrams, system diagrams, and flowcharts that relate to transmit power adjustment based on IUC.

FIG. 1 illustrates an example of a wireless communications system 100 that supports transmit power adjustment based on IUC in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support transmit power adjustment based on IUC as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback (e.g., an acknowledgment (ACK) and a negative ACK (NACK)) is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In wireless communications system 100, sidelink communications may include communications over one or more sidelink channels. For instance, sidelink data transmissions may be over a physical sidelink shared channel (PSSCH), sidelink discovery expression transmissions may be over a physical sidelink discovery channel (PSDCH) (e.g., to allow proximal devices to discover each other's presence), sidelink control information transmissions may be over a physical sidelink control channel (PSCCH), sidelink feedback transmissions may be over a physical sidelink feedback channel (PSFCH), and sidelink broadcast transmissions may be over a physical sidelink broadcast channel (PSBCH). Sidelink communications may also include transmitting reference signals from one UE 115 to another UE 115.

In some aspects, a network entity 105 may facilitate the scheduling of resources for sidelink communications (e.g., in a resource allocation mode-1 or mode-1 sidelink communications). In other aspects, sidelink communications may be carried out between UEs 115 without the involvement of a network entity 105 (e.g., in a resource allocation mode-2 or mode-2 sidelink communications). In mode-2 sidelink communications, sidelink UEs 115 may autonomously reserve resources (e.g., without the involvement of a network entity 105). That is, mode-2 sidelink communications may be supported without the presence of a central entity (e.g., such as a network entity 105). After identifying resources to reserve for one or more sidelink transmissions, a UE 115 may transmit sidelink control information (SCI) on sidelink resources to reserve the identified resources.

In some cases, to improve scheduling and avoid interference and collisions (e.g., in mode-2 sidelink communications), UEs 115 may exchange messages to coordinate communications on sidelink resources. Such messages may be referred to as IUC messages. In one example, if a first UE 115 identifies non-preferred resources for transmissions from a second UE 115 (e.g., based on the non-preferred resources being reserved by a third UE 115), the first UE 115 may transmit an IUC message to the second UE 115 indicating the non-preferred resources. In another example, if a first UE 115 detects a conflict between a second UE 115 and a third UE 115 (e.g., reservations of the same resources by the second UE 115 and the third UE 115), the first UE 115 may transmit an IUC message to the second UE 115 indicating conflicting resources between the second UE 115 and the third UE 115. In either of these examples, the second UE 115 may avoid transmitting on the non-preferred resources or the conflicting resources to avoid interference and collisions. Improved techniques for utilizing non-preferred resources or conflicting resources may be desirable.

The described techniques relate to transmit power adjustment based on IUC to improve the utilization of non-preferred resources, conflicting resources, or other communication resources. In one aspect, when a first UE 115 identifies non-preferred resources for a sidelink transmission from a second UE 115, the first UE 115 may transmit an indication of the non-preferred resources to the second UE 115 and an indication of an amount of transmit power reduction for the second UE 115 to observe for a sidelink transmission on the non-preferred resources. In another aspect, when a first UE 115 identifies conflicting resources reserved by a second UE 115 and a third UE 115, the first UE 115 may transmit an indication of an amount of transmit power reduction for the second UE 115 to observe for a sidelink transmission on the conflicting resources. Because the second UE 115 may transmit on the non-preferred resources or the conflicting resources with reduced power (e.g., rather than suppressing transmissions on the non-preferred resources or the conflicting resources), the utilization of the non-preferred resources or the conflicting resources may be improved.

Figure 2:
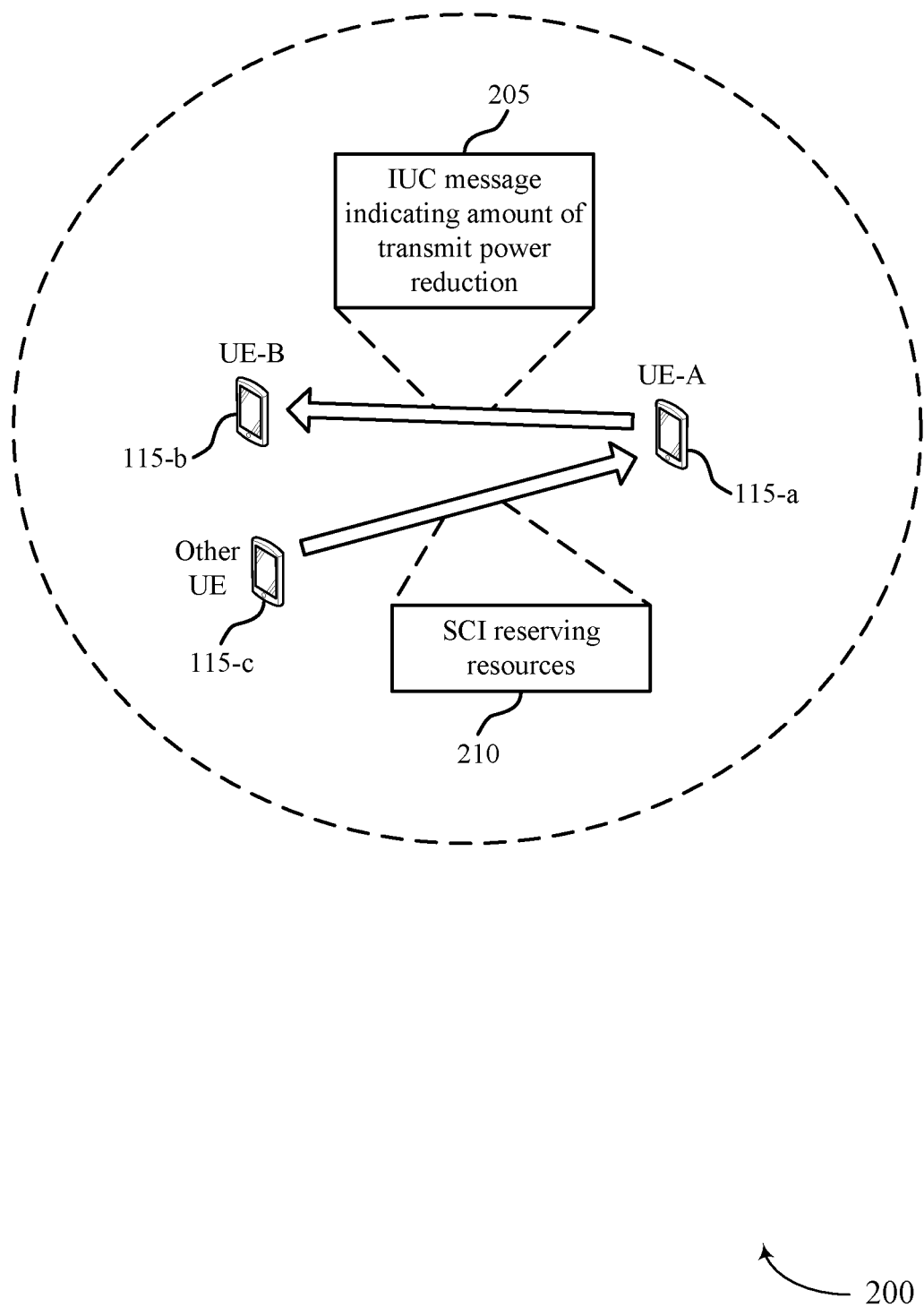
FIG. 2 illustrates an example of a wireless communications system that supports transmit power adjustment based on IUC in accordance with one or more aspects of the present disclosure.

FIG. 2 illustrates an example of a wireless communications system 200 that supports transmit power adjustment based on IUC in accordance with one or more aspects of the present disclosure. The wireless communications system 200 includes a first UE 115-*a*, a second UE 115-*b*, and a third UE 115-*c*, which may be examples of UEs 115 described with reference to FIG. 1. For instance, the first UE 115-*a* may be an example of a UE-A, the second UE 115-*b* may be an example of a UE-B, and the third UE 115-*c* may be an example of another UE 115. The wireless communications system 200 may implement aspects of the wireless communications system 100. For instance, the wireless communications system 200 may support efficient techniques for transmit power adjustment based on IUC to improve the utilization of communication resources.

In one aspect, the first UE 115-*a* may receive SCI 210 from the third UE 115-*c* reserving resources for a sidelink transmission by the third UE 115-*c*, and the first UE 115-*a* may determine that the resources reserved by the third UE 115-*c* are non-preferred for a sidelink transmission by the second UE 115-*b*. The resources reserved by the third UE 115-*c* that are non-preferred for a sidelink transmission by the second UE 115-*b* may be referred to as non-preferred resources. The first UE 115-*a* may transmit an IUC message 205 to the second UE 115-*b* indicating an amount of transmit power reduction for the second UE 115-*b* to observe for a sidelink transmission on the non-preferred resources. The indication of non-preferred resources in an IUC message 205 may correspond to a first scheme for IUC (e.g., a scheme1).

In some examples, in the IUC message 205 (e.g., IUC information) from the first UE 115-*a* to the second UE 115-*b*, the first UE 115-*a* may explicitly indicate to the second UE 115-*b* an amount of transmit power reduction (e.g., how much the second UE 115-*b* should lower a transmit power) if the second UE 115-*b* determines to transmit on the non-preferred resources indicated in the IUC message 205. The IUC message 205 (e.g., IUC information) may be an SCI message or a MAC-CE, and the indication of the amount of transmit power reduction may be included in one or more fields of the SCI message or the MAC-CE. In an example, the first UE 115-*a* may inform the second UE 115-*b* that if the second UE 115-*b* determines to transmit on the non-preferred resources, the second UE 115-*b* should lower a transmit power by 1 dB, 3 dB, 5 dB, etc. In some examples, the IUC message 205 may indicate an index to a list of different amounts of transmit power reduction, and the index may correspond to the amount of transmit power reduction for the second UE 115-*b* to observe for a sidelink transmission on the non-preferred resources.

In another aspect, the first UE 115-*a* may receive SCI 210 from the third UE 115-*c* reserving resources for a sidelink transmission by the third UE 115-*c*, and the first UE 115-*a* may receive SCI from the second UE 115-*b* reserving resources for a sidelink transmission by the second UE 115-*b*. The first UE 115-*a* may determine that the resources reserved by the third UE 115-*c* overlap with the resources reserved by the second UE 115-*b*. The overlapping resources may be referred to as conflicting resources. The first UE 115-*a* may transmit an IUC message 205 to the second UE 115-*b* indicating an amount of transmit power reduction for the second UE 115-*b* to observe for a sidelink transmission by the second UE 115-*b* on the conflicting resources. The indication of conflicting resources in an IUC message 205 may correspond to a second scheme for IUC (e.g., a scheme2).

In some examples, the first UE 115-*a* may transmit the IUC message 205 with a cyclic shift corresponding to an amount of transmit power reduction for the second UE 115-*b* to observe for a sidelink transmission by the second UE 115-*b* on the conflicting resources. The IUC message 205 may be a PSFCH waveform (e.g., a PSFCH format 0 waveform). In some examples, a number of cyclic shifts (e.g., 12 cyclic shifts) may be possible or available for a PSFCH waveform. Each cyclic shift may be defined by a cyclic shift offset (m_CS) and an initial cyclic shift (m_0). For instance, (m_0+m_CS) may be one of the cyclic shifts available for a PSFCH waveform. Out of 12 cyclic shifts, up to six cyclic shifts may be assigned for use with m_0. For instance, m_CS may be set to zero, and six different values of m_0 may be assigned for six different cyclic shifts.

In some examples, m_CS may be set to one of a set of remaining values corresponding to a set of remaining cyclic shifts to indicate transmit power adjustments that the second UE 115-*b* should make if the second UE 115-*b* determines to transmit on conflicted resources indicated by the first UE 115-*a*. In an example, m_0 may be set to zero, and m_CS may be set to zero to indicate zero or no transmit power adjustment. In another example, m_0 may be set to zero, and m_CS may be set to six to indicate a transmit power adjustment of 3 dB. As such, if the first UE 115-*a* transmits PSFCH format 0 with m_CS set to zero, the second UE 115-*b* may avoid using conflicted resources for a sidelink transmission by the second UE 115-*b*. If the first UE 115-*a* transmits PSFCH format 0 with m_CS set to six, the second UE 115-*b* may use conflicted resources for a sidelink transmission by the second UE 115-*b* provided that the second UE 115-*b* lowers a transmit power by 3 dB.

In some aspects, a first UE 115-*a* may receive an IUC request from a second UE 115-*b*, or a condition may be triggered at the first UE 115-*a* to transmit the IUC message 205. The first UE 115-*a* may transmit the IUC message 205 to the second UE 115-*b*, and the second UE 115-*b* may receive the IUC message 205 from the first UE 115-*a* and may use the IUC message 205 for resource selection or reselection for a data transmission from the second UE 115-*b*. In some examples, the first UE 115-*a* may not be a target receiver of a data transmission from the second UE 115-*b*. In other examples, the first UE 115-*a* may be a target receiver of a data transmission from the second UE 115-*b* (e.g., when transmission of the IUC message 205 is triggered by a request from the second UE 115-*b*).

The IUC message 205 may be capable of carrying or indicating preferred or non-preferred resources identified by the first UE 115-*a* for transmissions by the second UE 115-*b*. In accordance with the techniques described herein, when the IUC message 205 includes non-preferred resources, the IUC message 205 may also indicate how much the second UE 115-*b* should lower a transmit power in order to use the non-preferred resources. In some examples, whether transmission of the IUC message 205 may be triggered by a request from the second UE 115-*b* may be enabled or disabled by a configuration. In some examples, whether transmission of the IUC message 205 may be triggered by a condition at the first UE 115-*a* may be enabled or disabled by a configuration. In some examples, the first UE 115-*a* may support or implement mode-2 sidelink communications.

An indication of preferred resources using the IUC message 205 may enable transmission resource selection based on channel sensing at a receiving UE 115. An indication of non-preferred resources using the IUC message 205 (e.g., in accordance with the described techniques) may enable transmission resource selection based on assistance from a receiving UE 115. The triggering of a transmission of the IUC message 205 based on a request from the second UE 115-*b* may enable intelligent or enhanced transmission resource selection. The triggering of a transmission of the IUC message 205 based on a condition at the first UE 115-*a* may enable protection of receiver resources by a receiving UE 115. In some examples, transmission resource selection may be based on channel sensing at a transmitter UE 115 (e.g., only), without protection of receiver resources by a receiving UE 115.

The IUC message 205 may indicate preferred resources and may be triggered by a request from the second UE 115-*b* if the second UE 115-*b* determines to request that the first UE 115-*a* informs the second UE 115-*b* of transmission resources for the second UE 115-*b* to use to transmit (e.g., if the first UE 115-*a* is an intended receiver of a transmission from the second UE 115-*b*). The IUC message 205 may indicate preferred resources and may be triggered by a condition at the first UE 115-*a* if the first UE 115-*a* determines to inform the second UE 115-*b* of transmission resources for the second UE 115-*b* to use to transmit (e.g., if the first UE 115-*a* is an intended receiver of a transmission from the second UE 115-*b*).

The IUC message 205 may indicate non-preferred resources and may be triggered by a request from the second UE 115-*b* if the second UE 115-*b* determines to request that the first UE 115-*a* informs the second UE 115-*b* of transmission resources for the second UE 115-*b* to use to transmit with a reduced power (e.g., where the first UE 115-*a* may or may not be a target receiver of a transmission from the second UE 115-*b*). The IUC message 205 may indicate non-preferred resources and may be triggered by a condition at the first UE 115-*a* if the first UE 115-*a* determines to inform the second UE 115-*b* of transmission resources for the second UE 115-*b* to use to transmit with a reduced power (e.g., where the first UE 115-*a* may or may not be a target receiver of a transmission from the second UE 115-*b*).

In some implementations, the first UE 115-*a* may transmit an indication of non-preferred resources in the IUC message 205 based on resources reserved by one or more other UEs (e.g., the third UE 115-*c*).

In some examples, the non-preferred resources may include reserved resources of a third UE 115-*c* (e.g., another UE 115) identified by the first UE 115-*a* whose reference signal received power (RSRP) measurement is greater than an RSRP threshold. The first UE 115-*a* may determine the RSRP threshold for the third UE 115-*c* based on a priority value indicated by the SCI 210 of the third UE 115-*c*. When the first UE 115-*a* is an intended receiver of a transmission from the second UE 115-*b*, the first UE 115-*a* may determine that the second UE 115-*b* is to avoid transmitting on the non-preferred resources, because, if the second UE 115-*b* transmits on the non-preferred resources, the transmission from the second UE 115-*b* may experience interference from the third UE 115-*c* (e.g., the first UE 115-*a* may be less likely to receive the transmission from the second UE 115-*b* due to interference from the third UE 115-*c*). For instance, the RSRP of a transmission from the third UE 115-*c* may be high, so the first UE 115-*a* may determine that the second UE 115-*b* is to avoid transmitting on the same resources as the third UE 115-*c* (e.g., since the transmission from the third UE 115-*c* may interfere with reception at the first UE 115-*a* of a transmission from the second UE 115-*b*).

In some other examples, the non-preferred resources may include reserved resources of a third UE 115-*c* (e.g., another UE 115) identified by the first UE 115-*a* whose RSRP measurement is less than a RSRP threshold. The first UE 115-*a* may determine the RSRP threshold for the third UE 115-*c* based on a priority value indicated by the SCI 210 of the third UE 115-*c* when the first UE 115-*a* is a destination or intended receiver of a transport block transmitted by the third UE 115-*c*. When the first UE 115-*a* is an intended receiver of the third UE 115-*c*, the first UE 115-*a* may determine that a second UE 115-*b* is to transmit with a reduced transmit power on the resources reserved by the third UE 115-*c* because the first UE 115-*c* may be receiving a transmission from the third UE 115-*c* on the resources reserved by the third UE 115-*c*. For instance, an RSRP of a transmission from the third UE 115-*c* may be low, and the first UE 115-*a* may determine that the second UE 115-*b* is to transmit with a reduced transmit power on the same resources as the third UE 115-*c* (e.g., since, otherwise, the second UE 115-*b* may cause too much interference to reception at the first UE 115-*a*).

In some implementations, the first UE 115-*a* may transmit an indication of non-preferred resources in the IUC message 205 based on resources reserved by the first UE 115-*a*. The first UE 115-*a* may be an intended receiver of a transmission from the second UE 115-*b*. The non-preferred resources may include resources (e.g., slots) where the first UE 115-*a* (e.g., when it is an intended receiver of the second UE 115-*b*) does not expect to perform sidelink reception from the second UE 115-*b* due to a half-duplex operation. For instance, the non-preferred resources may include resources to be used by the first UE 115-*a* for a sidelink transmission (e.g., since the first UE 115-*a* may be unable to simultaneously transmit the sidelink transmission and receive a sidelink transmission from the second UE 115-*b* when operating in a half-duplex mode).

Figure 3:
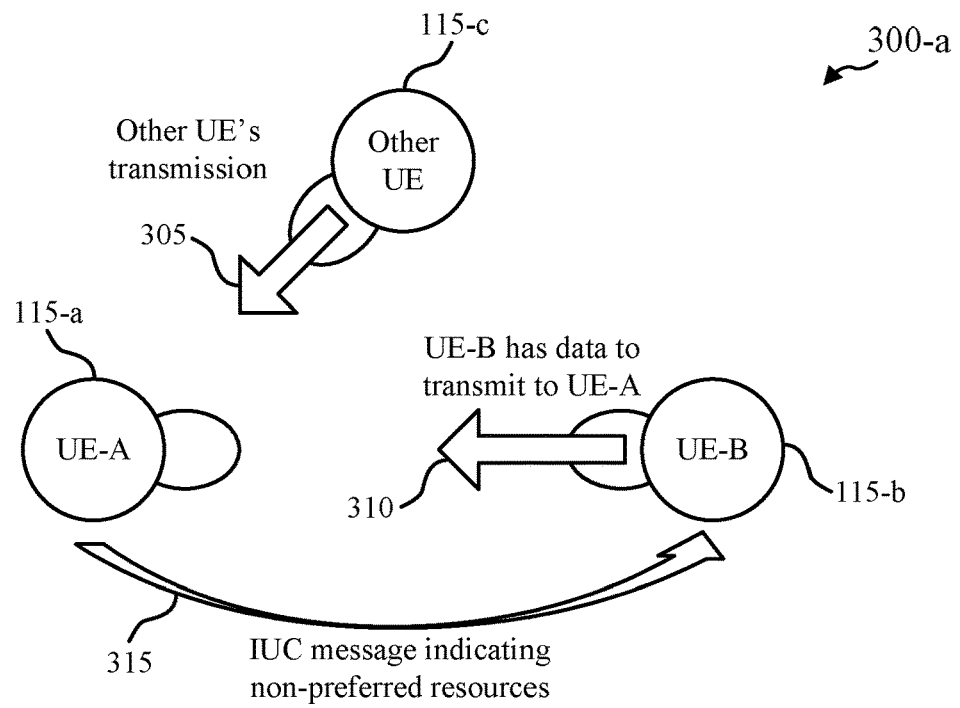
FIG. 3 illustrates examples of non-preferred resources in accordance with one or more aspects of the present disclosure.
Figure 3:
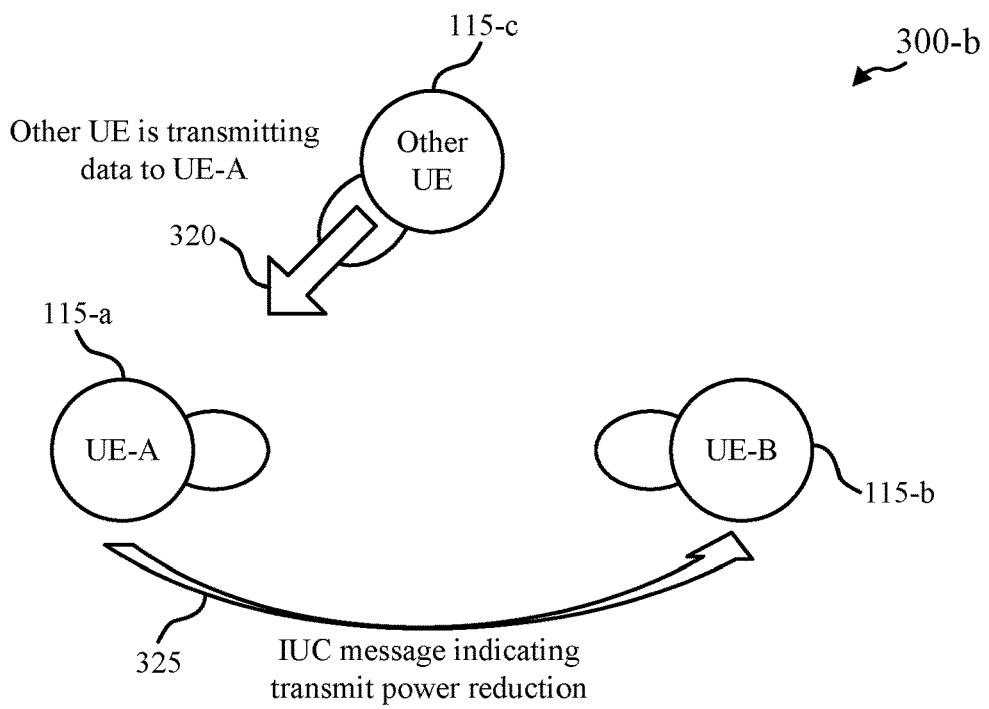

FIG. 3 illustrates examples of non-preferred resources 300 in accordance with one or more aspects of the present disclosure.

In a first example 300-*a*, a first UE 115-*a* may identify a transmission 305 from a third UE 115-*c*, and the first UE 115-*a* may determine that the transmission 305 is associated with an RSRP that is greater than an RSRP threshold (e.g., subchannels reserved by the third UE 115-*c* may be expected to include transmissions with an RSRP that is greater than an RSRP threshold). The RSRP threshold may be based (e.g., at least) on a priority of the third UE 115-*c* and a mapping between the priority and a threshold. Because the transmission 305 may be associated with an RSRP that is larger than an RSRP threshold, the first UE 115-*a* may determine that resources reserved for the transmission 305 are non-preferred resources for the second UE 115-*b*. That is, the first UE 115-*a* may prefer for the second UE 115-*b* to avoid a transmission 310 to the first UE 115-*a* on resources reserved by the third UE 115-*c* for the transmission 305. The transmission 305 from the third UE 115-*c* may or may not be intended for the first UE 115-*a*. Thus, the first UE 115-*a* may transmit an IUC message 315 to the second UE 115-*b* indicating the non-preferred resources.

In a second example 300-*b*, a first UE 115-*a* may identify a transmission 320 from a third UE 115-*c* for the first UE 115-*a*, and the first UE 115-*a* may determine that the transmission 320 is associated with an RSRP that is less than an RSRP threshold (e.g., subchannels reserved by the third UE 115-*c* may be expected to include transmissions with an RSRP that is less than an RSRP threshold). The RSRP threshold may be based (e.g., at least) on a priority of the third UE 115-*c* and a mapping between the priority and a threshold. Because the transmission 320 may be associated with an RSRP that is less than an RSRP threshold, the first UE 115-*a* may determine that resources reserved for the transmission 320 are non-preferred resources for the second UE 115-*b*. The first UE 115-*a* may determine that the second UE 115-*b* may transmit on the resources reserved by the third UE 115-*c* for the transmission 320 if the second UE 115-*b* reduces a transmit power. The first UE 115-*a* may transmit an IUC message 325 to the second UE 115-*b* indicating the non-preferred resources and indicating an amount of transmit power reduction for the second UE 115-*b* to observe for a transmission on the non-preferred resources.

In some examples, a second UE 115-*b* may use a MAC-CE or an SCI 2-C message for an IUC request (e.g., a request for an IUC message). The MAC-CE and SCI 2-C request formats may be the same (e.g., may include the same fields). An IUC request format may enable the second UE 115-*b* to transmit transmission parameters for an intended transmission by the second UE 115-*b* (e.g., a priority, a number of subchannels, a resource reservation interval (RRI), and resource selection window (RSW) start or end times). An IUC request format may also enable the second UE 115-*b* to indicate which resource set type (e.g., preferred or non-preferred) the first UE 115-*a* is to include in IUC information (e.g., an IUC message).

In some examples, a first UE 115-*a* may use a MAC-CE or an SCI 2-C for IUC information. The MAC-CE and SCI 2-C formats may be the same (e.g., may include the same fields). A MAC-CE may be used to indicate more than two preferred or non-preferred resources, and a MAC-CE or SCI 2-C may be used to indicate two or less preferred or non-preferred resources. Each preferred or non-preferred resource may be indicated using a time resource indicator value (TRIV) (e.g., a time offset), a frequency resource indicator value (FRIV) (e.g., a frequency offset), and an RRI. IUC information may include a providing or requesting indicator, resource combinations (e.g., including a number of resources indicated in the IUC information), a first resource location, a reference slot location, a resource set type, lowest subchannel indices for the first resource location of each TRIV, or any combination thereof. The resource set type may indicate whether the IUC information indicates preferred or non-preferred resources.

In some aspects, a first UE 115-*a* may receive SCI from a second UE 115-*b* reserving resources for a sidelink transmission, and the first UE 115-*a* may transmit an IUC message to the second UE 115-*b* if the first UE 115-*a* detects an expected or potential resource conflict with the second UE 115-b. The first UE 115-a may or may not be a target receiver of a transmission from the second UE 115-b. The second UE 115-b may receive the IUC message from the first UE 115-a, and the second UE 115-b may use the IUC message for resource selection or reselection. The IUC message may include an indication of an expected or potential resource conflict. In some examples, the first UE 115-a may support or implement mode-2 sidelink communications. In some examples, IUC may be enabled, disabled, or controlled by a configuration.

A first UE 115-a may correspond to a UE 115 that detects expected or potential conflicts on resources indicated or reserved by SCI from a second UE 115-b and transmits IUC information to the second UE 115-b. The expected or potential conflicts may include conflicting resources reserved by the second UE 115-b and at least one other UE 115. The conflicting resources may also refer to conflicting transport blocks. The first UE 115-a may be at least a destination UE of one of the conflicting transport blocks (e.g., transport blocks to be transmitted in expected or potential conflicting resources). Whether a non-destination UE 115 of a transport block transmitted by the second UE 115-b may be the first UE 115-a may be indicated to a UE 115 or configured in local storage of the UE 115.

A second UE 115-b may correspond to a UE 115 that transmits PSCCH or PSSCH with SCI indicating reserved resources to be used for a transmission by the second UE 115-b, receives IUC information from a first UE 115-a indicating expected or potential resource conflicts for the reserved resources, and uses the IUC information to determine resource reselection or to transmit on conflicting resources with a reduced transmit power. A field in SCI format 1-A carrying an 'IndicationUEB' bit may be used to indicate whether a UE 115 scheduling a conflicting transport block may be a second UE 115-b (e.g., if an 'indicationUEBScheme2' is set to 'enabled').

Figure 4:
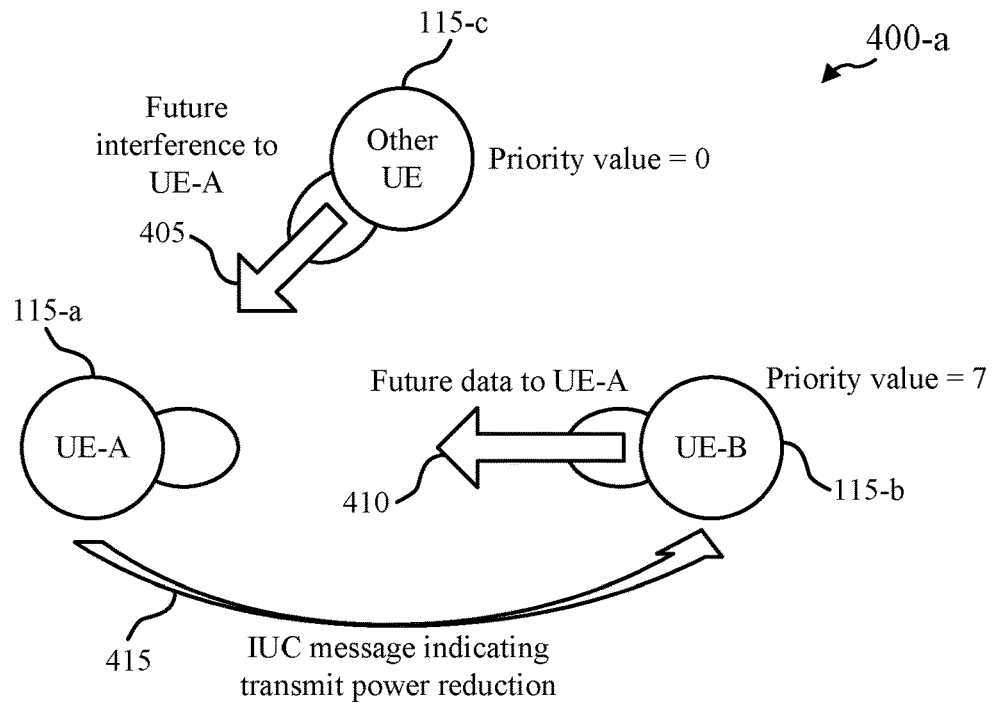
FIG. 4 illustrates examples of conflicting resources in accordance with one or more aspects of the present disclosure.
Figure 4:
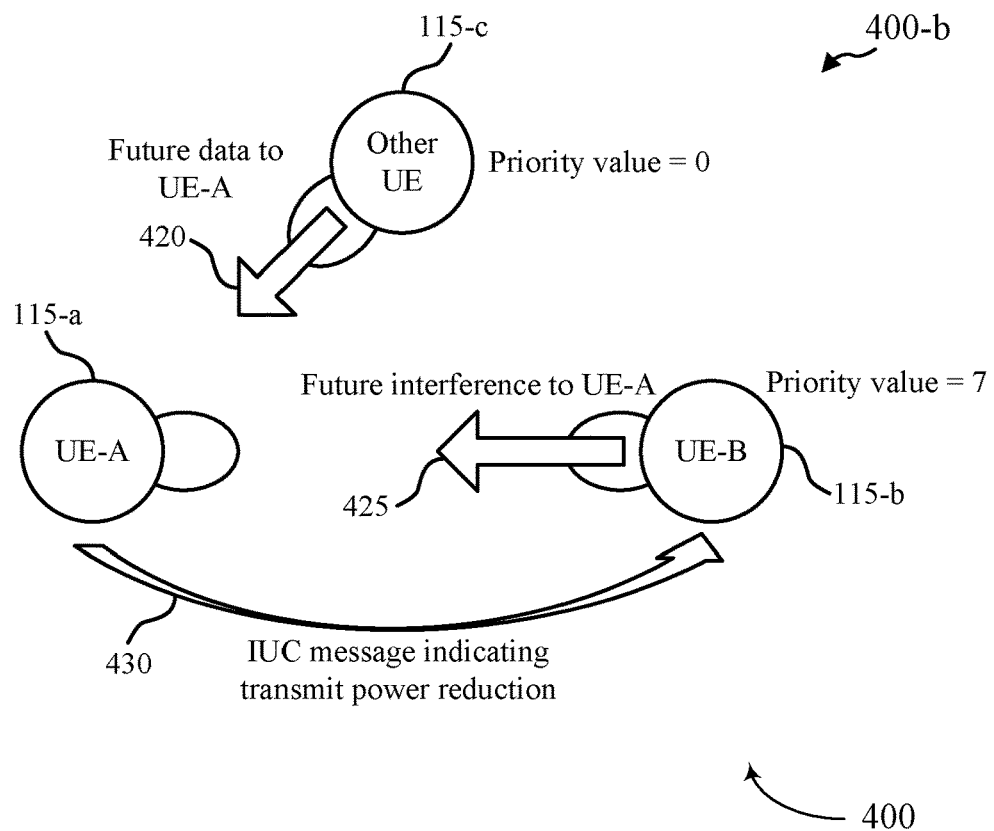

FIG. 4 illustrates examples of conflicting resources 400 in accordance with one or more aspects of the present disclosure.

In a first example 400-a, a first UE 115-a may receive a resource reservation for a transmission 405 from a third UE 115-c which conflicts with a resource reservation for a transmission 410 from a second UE 115-b. The second UE 115-b may be a target transmitter of a transmission 410 to the first UE 115-a, and the transmission 405 from the third UE 115-c may interfere with the transmission 410 from the second UE 115-b. The first UE 115-a may transmit an IUC message 415 (e.g., a resource conflict indication) to the second UE 115-b indicating an amount of transmit power reduction for the second UE 115-b to observe for the transmission 410 (e.g., on conflicting resources). The first UE 115-a may determine to transmit the IUC message 415 to the second UE 115-b (e.g., rather than the third UE 115-c) based on the second UE 115-b being associated with a lower priority than the first UE 115-b. A lower priority may correspond to a higher priority value (e.g., seven), and a higher priority may correspond to a lower priority value (e.g., zero).

In a second example 400-b, a first UE 115-a may receive a resource reservation for a transmission 425 from a second UE 115-b which conflicts with a resource reservation for a transmission 420 from a third UE 115-c. The third UE 115-c may be a target transmitter of a transmission 420 to the first UE 115-a, and the transmission 425 from the second UE 115-b may interfere with the transmission 420 from the third UE 115-c. The first UE 115-a may transmit an IUC message 430 (e.g., a resource conflict indication) to the second UE 115-b indicating an amount of transmit power reduction for the second UE 115-b to observe for the transmission 425 (e.g., on conflicting resources). In some examples, the first UE 115-a may transmit the IUC message 430 to the second UE 115-b if a 'non-destination UE of a transport block transmitted by UE-B can be UE-A' is enabled (e.g., the first UE 115-a may be allowed to transmit the IUC message 430 to the second UE 115-b). The first UE 115-a may determine to transmit the IUC message 430 to the second UE 115-b (e.g., rather than the third UE 115-c) based on the second UE 115-b being associated with a lower priority than the first UE 115-b. A lower priority may correspond to a higher priority value (e.g., seven), and a higher priority may correspond to a lower priority value (e.g., zero).

In some examples, a first UE 115-a may support one or more techniques for determining that there is a resource conflict with a transmission from a second UE 115-b. For instance, the first UE 115-a may expect to receive a transmission from another UE 115 in a resource r1, but a second UE 115-b may reserve the resource r1 for a transmission (e.g., a transmission not intended for the first UE 115-a), so there may be a resource conflict. A determination of a resource conflict may depend on how much power a first UE 115-a receives from a second UE 115-b. A first UE 115-a may indicate a resource conflict in r1 to a second UE 115-b using a PSFCH for conflict indication. When the second UE 115-b receives a conflict indication from the first UE 115-a, the second UE 115-b may reduce a transmit power for transmitting on conflicting resources by an amount of transmit power reduction (e.g., X dB) indicated by the first UE 115-a.

A PSFCH for a conflict indication may use a PSFCH format 0 waveform. For instance, a PSFCH format 0 from a first UE 115-a may be used to indicate an expected or potential resource conflict on reserved resources indicated by SCI from a second UE 115-b. For allocating PSFCH resources for an IUC message indicating conflicting resources, at least a resource block set for a conflict indication (e.g., a sl-PSFCH-Conflict-RB-Set) may be configured separately from a resource block set for HARQ-ACK feedback (e.g., a sl-PSFCH-RB-Set). A UE 115 may expect that different physical resource blocks (PRBs) may be configured between a conflict indication and HARQ-ACK information.

A first UE 115-a may determine an index of a PSFCH resource for IUC message transmission. For an IUC message transmission in a PSFCH resource, a resource identifier (e.g., P_ID) may be an L1-Source ID indicated by SCI from a second UE 115-b, an M_ID may be zero, an m_CS value may be zero for a resource conflict indication for a next reserved resource indicated by SCI from a second UE 115-b for either a current transport block transmission or a next transport block transmission, and an m_0 value for a resource conflict indication may be derived in a same way as specified for HARQ-ACK information. In some examples, a waveform parameter (e.g., a cyclic shift offset, m_CS) may be used to indicate an amount of transmit power reduction for a second UE 115-b to observe for a sidelink transmission on conflicting resources.

In some examples, a first UE 115-a may select a second UE 115-b to which to transmit an IUC message based on one or more factors. For instance, the first UE 115-a may receive SCI messages from multiple other UEs 115, and the other UEs 115 may reserve conflicting resources. As such, it may be appropriate for the first UE 115-a to efficiently select one or more of the UEs 115 to which to transmit an IUC message indicating an amount of transmit power reduction for the one or more UEs 115 to observe for transmitting on the conflicting resources. If 'a non-destination UE of a transport block transmitted by UE-B can be UE-A' ('typeAUEScheme2') is enabled, the first UE 115-*a* may select a second UE 115-*b* to which to transmit an IUC message even if the second UE 115-*b* has not reserved the conflicting resources for a transmission to the first UE 115-*a*.

In an example, a first UE 115-*a* may identify resources reserved by a UE1, a UE2, and a UE3. A resource reservation by UE1 may have a priority value of four, a resource reservation by UE2 may have a priority value of zero, and a resource reservation by UE3 may have a priority value of seven. At least UE1 may be a target transmitter for the first UE 115-*a* (e.g., may reserve resources for transmissions to the first UE 115-*a*). If UE1 and UE2 reserves a first conflicting resource, UE1 should yield the first conflicting resource since UE1 has a lower priority than UE2. So UE1 may be chosen to be UE-B for the first conflicting resource. If UE1 and UE3 reserves a second conflicting resource, UE3 should yield the second conflicting resource since UE3 has a lower priority than UE1. So UE3 may be chosen to be UE-B for the second conflicting resource. If UE1, UE2, and UE3 reserve a third conflicting resource, UE1 and UE3 should yield the third conflicting resource since UE1 and UE3 both have lower priorities than UE2. So UE1 and UE3 may each be chosen to be a UE-B. If UE2 and UE3 reserves a fourth conflicting resource, the first UE 115-*a* may avoid transmitting an IUC message to UE2 or UE3 since UE2 and UE3 are not target transmitters of transmissions to the first UE 115-*a*. In accordance with the described techniques, yielding a resource may correspond to transmitting on the resource with a reduced transmit power.

A selected UE-B may correspond to a second UE 115-*b*, and the first UE 115-*a* may transmit an IUC message to the second UE 115-*b* indicating that the second UE 115-*b* is to reduce a transmit power for transmitting on a conflicting resource. Between a pair of UEs 115 reserving conflicting resources (e.g., a same one or more resources), at least one UE 115 may be a target transmitter for the first UE 115-*a* (e.g., for the first UE 115-*a* to transmit an IUC message indicating the conflicting resources), and the UE 115 associated with a lower priority may be chosen as UE-B or as a second UE 115-*b*. A first UE 115-*a* may transmit an IUC message to a second UE 115-*b* indicating an amount of transmit power reduction for the second UE 115-*b* to observe for a sidelink transmission on a conflicting resource (e.g., a resource that the second UE 115-*b* has yielded). In some examples, if 'a non-destination UE of a transport block transmitted by UE-B can be UE-A" is disabled, the first UE 115-*a* may not transmit an IUC message to a selected UE-B if conflicting resources reserved by the selected UE-B are not reserved for a transmission to the first UE 115-*a*. For instance, the first UE 115-*a* may avoid transmitting an IUC message to UE3 for the second conflicting resource described above (e.g., since the first UE 115-*a* may not be a destination UE of a transmission from UE3). An actual transmission of an IUC message for a resource with a conflict may be determined by an RSRP of the UEs 115 reserving the conflicting resource.

In some examples, a first UE 115-*a* may consider that an expected or potential conflict may occur in resources satisfying one or more conditions.

In one example, conflicting resources may include resources reserved by other UEs 115 identified by a first UE 115-*a* that may be fully or partially overlapping in time or frequency with resources indicated by SCI from a second UE 115-*b*. 'A non-destination UE of a transport block transmitted by UE-B can be UE-A' may be enabled. Alternatively, 'a non-destination UE of a transport block transmitted by UE-B can be UE-A' may be disabled, and a destination UE 115 of conflicting transport blocks may be the first UE 115-*a*. For each pair of UEs 115 scheduling conflicting transport blocks whose PSFCH occasions for a resource conflict indication have not yet passed and an 'indicationUEB' flag is set to one if a higher parameter of 'indicationUEBScheme2' is set to 'enabled,' a UE 115 with a higher priority value may be UE-B or a second UE 115-*b* (e.g., where a higher priority value corresponds to a lower priority or less important UE 115). When UEs 115 in a pair have a same priority value, the first UE 115-*a* may determine one of the UEs 115 to be a UE-B using other techniques.

In another example, conflicting resources may include resources (e.g., slots) where a first UE 115-*a* is an intended receiver of a second UE 115-*b*, and the first UE 115-*a* does not expect to perform sidelink reception from the second UE 115-*b* due to half-duplex operation.

In some examples, a first UE 115-*a* may consider SCIs received earlier than or equal to a threshold time (e.g., corresponding to a sl-MintimeGapPSFCH) before a PSFCH occasion for a conflict indication when determining a UE-B or second UE 115-*b*. For instance, if a first UE 115-*a* receives SCI messages from a UE1, a UE2, and a UE3 reserving conflicting resources, but the SCI from the UE3 is received after a threshold time before a PSFCH occasion, the first UE 115-*a* may select a second UE 115-*b* from UE1 and UE2. That is, the first UE 115-*a* may not consider UE3 when selecting the second UE 115-*b*, and UE3 cannot be UE-B. Thus, the first UE 115-*a* may not send an IUC message to UE3 because some criteria (e.g., a sl-MinTimeGapPSFCH criteria) may not be satisfied (e.g., even though there may still be a conflict between UE1, UE2, and UE3). Between UE1 and UE2, the first UE 115-*a* may select UE1 to receive an IUC message if UE1 is associated with a lower priority than UE2.

In some examples, a resource pool level configuration may support additional criteria to determine conflicting resources (e.g., resources where an expected or potential resource conflict occurs). If a first UE 115-*a* is a destination UE 115 of a transport block transmitted by a second UE 115-*b*, and an RSRP of another UE 115 in a conflicting resource is greater than an RSRP threshold (e.g., an absolute interference is high) or a difference between the RSRP of another UE 115 in a conflicting resource and an RSRP of the second UE 115-*b* in the conflicting resource is greater than an RSRP threshold (e.g., a relative interference is high), the first UE 115-*a* may transmit an IUC message to the second UE 115-*b* indicating the conflicting resource. If a first UE 115-*a* is a destination UE 115 of a transport block transmitted by another UE 115, and an RSRP of a second UE 115-*b* in a conflicting resource is greater than an RSRP threshold (e.g., an absolute interference is high) or a difference between the RSRP of the second UE 115-*b* in a conflicting resource and an RSRP of the other UE 115 in the conflicting resource is greater than an RSRP threshold (e.g., a relative interference is high), the first UE 115-*a* may transmit an IUC message to the second UE 115-*b*. An RSRP threshold may or may not depend on a priority of the second UE 115-*b*, a priority of the other UE 115, or both.

In an example, a first UE 115-*a* may identify resources reserved by a UE1, a UE2, and a UE3. A resource reservation by UE1 may have a priority value of four, a resource reservation by UE2 may have a priority value of zero, and a resource reservation by UE3 may have a priority value of seven. At least UE1 may be a target transmitter for the first UE 115-a (e.g., may reserve resources for a transmission to the first UE 115-a). That is, the first UE 115-a may be an intended receiver of a transmission from UE1. If UE1 and UE2 reserves a first conflicting resource, and a first UE 115-a selects UE1 as UE-B for the first conflicting resource (e.g., where UE2 is referred to as another UE 115), the first UE 115-a may determine that there is an actual conflict in the first conflicting resource and may transmit an IUC conflict indication to UE1 if an RSRP of UE2 is greater than an RSRP threshold. If UE1 and UE3 reserves a second conflicting resource, and a first UE 115-a selects UE3 as UE-B for the second conflicting resource (e.g., where UE1 is referred to as another UE 115), the first UE 115-a may determine that there is an actual conflict in the second conflicting resource and may transmit an IUC conflict indication to UE3 if an RSRP of UE1 is greater than an RSRP threshold. The RSRP threshold may depend on a priority of the second UE 115-b, a priority of the other UE 115, or both.

In some examples, a resource pool level configuration may include one of one or more options to determine a resource for a PSFCH transmission for a conflict indication. Each of these options may be configurable (e.g., enabled or disabled). A minimum time gap between a PSFCH and a slot where SCI is transmitted (e.g., sl-MinTimeGapPSFCH) may be configured for a conflict indication. Additionally, or alternatively, a minimum time gap between a PSFCH and a slot where an expected or potential resource conflict occurs on a PSSCH resource indicated by an SCI of $T_3$ may be configured for a conflict indication.

In one example, a PSFCH occasion may be derived by a slot where SCI from a second UE 115-b is transmitted. A first UE 115-a may reuse a PSSCH-to-PSFCH timing to determine a PSFCH occasion for a resource conflict indication. A time gap between a PSFCH and a slot where an expected or potential resource conflict occurs may be larger than or equal to a threshold time (e.g., $T_3$). If there is a PSFCH occasion satisfying a minimum time gap (e.g., a sl-MinTimeGapPSFCH) between a PSFCH occasion and a slot where SCI is transmitted, but not satisfying a minimum time gap ($T_3$) between the PSFCH occasion and a slot of an earliest reserved PSSCH resource indicted by a corresponding SCI after the PSFCH occasion, the PSFCH occasion may not be used by a first UE 115-a for a conflict indication for a reserved PSSCH resource other than an earliest reserved PSSCH resource indicated by the corresponding SCI after the PSFCH occasion.

In another example, a PSFCH occasion may be derived by a slot where an expected or potential conflict occurs on a PSSCH resource indicated by SCI from a second UE 115-b. A first UE 115-a may transmit a PSFCH in a latest slot that includes PSFCH resources for an IUC message and that is at least $T_3$ slots of the resource pool before the PSSCH resource indicated by SCI of the second UE 115-b in which an expected or potential resource conflict occurs. A time gap between a PSFCH and an SCI scheduling conflicting transport blocks may be larger than or equal to a threshold time (e.g., sl-MintimeGapPSFCH). A UE 115-a may not transmit a conflict indication or receive a conflict indication if a timeline is not satisfied.

Figure 5:
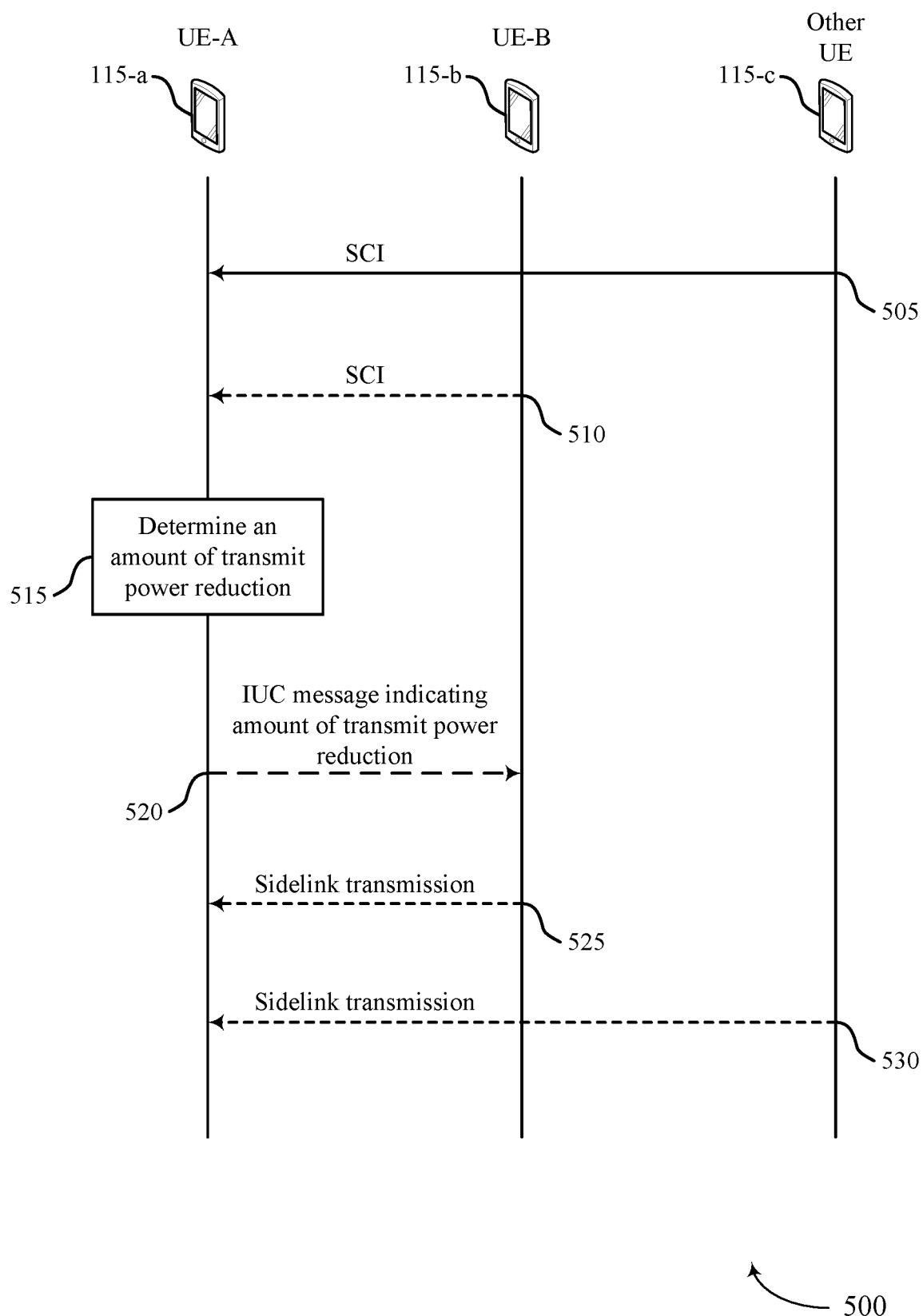
FIG. 5 illustrates an example of a process flow that supports transmit power adjustment based on IUC in accordance with one or more aspects of the present disclosure.

FIG. 5 illustrates an example of a process flow 500 that supports transmit power adjustment based on IUC in accordance with one or more aspects of the present disclosure. The process flow 500 includes a first UE 115-a, a second UE 115-b, and a third UE 115-c, which may be example of UEs 115 described with reference to FIGS. 1-4. For instance, the first UE 115-a may be an example of a UE-A, the second UE 115-b may be an example of a UE-B, and the third UE 115-c may be an example of another UE 115. The process flow 500 may implement aspects of the wireless communications system 100 or the wireless communications system 200. For instance, the process flow 500 may support efficient techniques for transmit power adjustment based on IUC to improve the utilization of communication resources.

In the following description of the process flow 500, the signaling exchanged between the first UE 115-a, the second UE 115-b, and the third UE 115-c may be exchanged in a different order than the example order shown, or the operations performed by the first UE 115-a, the second UE 115-b, and the third UE 115-c may be performed in different orders or at different times. Some operations may also be omitted from the process flow 500, and other operations may be added to the process flow 500.

At 505, the third UE 115-c may transmit, and the first UE 115-a may receive, SCI reserving a first set of resources for a first sidelink transmission by the third UE 115-c.

At 510, the second UE 115-b may transmit, and the first UE 115-a may receive, SCI (e.g., signaling) reserving a second set of resources for a second sidelink transmission by the second UE 115-b. The second set of resources reserved by the second UE 115-b may overlap with the first set of resources reserved by the third UE 115-c. The second sidelink transmission by the second UE 115-b may or may not be intended for the first UE 115-a (e.g., the second sidelink transmission by the second UE 115-b may cause interference to the first UE 115-a).

At 515, the first UE 115-a may determine an amount of transmit power reduction for the second UE 115-b to observe for the second sidelink transmission by the second UE 115-b via the second set of resources. In some examples, the first UE 115-a may determine the amount of transmit power reduction for the second UE 115-b to observe based on a measurement (e.g., received power) of the SCI at 510. In some examples, the first UE 115-a may determine the amount of transmit power reduction for the second UE 115-b to observe based on a measurement (e.g., RSRP) of the SCI at 505.

At 520, the first UE 115-a may transmit, and the second UE 115-b may receive, an IUC message (e.g., SCI or a MAC-CE) indicating the second set of resources and an amount of transmit power reduction for the second UE 115-b to observe for the second sidelink transmission by the second UE 115-b. The IUC message may indicate that the second UE 115-b is to avoid transmitting on the second set of resources unless the second UE 115-b may reduce a transmit power by the indicated amount of transmit power reduction. In some examples, the first UE 115-a may determine that a measurement (e.g., RSRP) performed on the SCI received from the third UE 115-c fails to satisfy a threshold, and the first UE 115-a may transmit the IUC message based on the measurement failing to satisfy the threshold. In some examples, the first UE 115-a may determine to transmit the IUC message to the second UE 115-b based on the second sidelink transmission being associated with a lower priority than the first sidelink transmission. In some examples, the second UE 115-b may transmit, and the first UE 115-a may receive, a request for the IUC message, and the first UE 115-a may transmit the IUC message to the second UE 115-b in response to the request.

In some examples, the first UE 115-a may transmit a resource set type in the IUC message, the resource set type indicating that the second set of resources includes non-preferred resources. In some examples, the first UE 115-a may transmit an indication that the IUC message indicates the amount of transmit power reduction for the second UE 115-*b* to observe for the second sidelink transmission by the second UE 115-*b* via the second set of resources. In some examples, the indication that the IUC message indicates the amount of transmit power reduction may be the resource set type in the IUC message. In some examples, the indication that the IUC message indicates the amount of transmit power reduction may be in another field in the IUC message. In some examples, the amount of transmit power reduction may be zero or some other value.

In some examples, the first UE 115-*a* may transmit the IUC message with a cyclic shift indicating the amount of transmit power reduction for the second UE 115-*b* to observe for the second sidelink transmission by the second UE 115-*b* via the second set of resources. The first UE 115-*a* may be configured with a set of multiple cyclic shifts. A first cyclic shift of the set of multiple cyclic shifts may indicate that the second UE 115-*b* is to avoid transmitting the second sidelink transmission via the second set of resources. Each other cyclic shift of the set of multiple cyclic shifts may indicate a different amount of transmit power reduction for the second UE 115-*b* to observe for the second sidelink transmission by the second UE 115-*b* via the second set of resources.

In some examples, the IUC message may indicate a first transmit power for the second UE 115-*b* to use for the second sidelink transmission by the second UE 115-*b* via the second set of resources. The first transmit power may correspond to an amount of transmit power reduction for the second UE 115-*b* to observe for the second sidelink transmission by the second UE 115-*b*. For instance, the first transmit power may be a transmit power resulting from reducing a second transmit power by the amount of transmit power reduction for the second UE 115-*b* to observe for the sidelink transmission by the second UE 115-*b* via the second set of resources.

In some examples, the first sidelink transmission from the third UE 115-*c* may be intended for the first UE 115-*a*. The first UE 115-*a* may perform a first measurement on the SCI received from the second UE 115-*b*, a second measurement on the SCI received from the third UE 115-*c*, or both. The first UE 115-*a* may transmit the IUC message to the second UE 115-*b* based on determining that the first measurement exceeds a first threshold or determining that a difference between the first measurement and the second measurement exceeds a second threshold. The first threshold may be referred to as an absolute interference threshold, and the second threshold may be referred to as a relative interference threshold.

In some examples, the second sidelink transmission from the second UE 115-*b* may be intended for the first UE 115-*a*. The first UE 115-*a* may perform a first measurement on the SCI received from the third UE 115-*b*, a second measurement on the SCI received from the second UE 115-*b*, or both. The first UE 115-*a* may transmit the IUC message to the second UE 115-*b* based on determining that the first measurement exceeds a first threshold or determining that a difference between the first measurement and the second measurement exceeds a second threshold. The first threshold may be referred to as an absolute interference threshold, and the second threshold may be referred to as a relative interference threshold.

At 525, the second UE 115-*b* may transmit, and the first UE 115-*a* may receive, the second sidelink transmission via the second set of resources in accordance with the indicated amount of transmit power reduction. For instance, the second UE 115-*b* may reduce a transmit power by the indicated amount of transmit power reduction before transmitting the second sidelink transmission via the second set of resources to the first UE 115-*a*.

At 530, the third UE 115-*c* may transmit, and the first UE 115-*a* may receive, the first sidelink transmission via the first set of resources. Because the second UE 115-*b* may reduce a transmit power by the indicated amount of transmit power reduction, the interference from the second sidelink transmission from the second UE 115-*b* on the first sidelink transmission from the third UE 115-*c* may be reduced.

Figure 6:
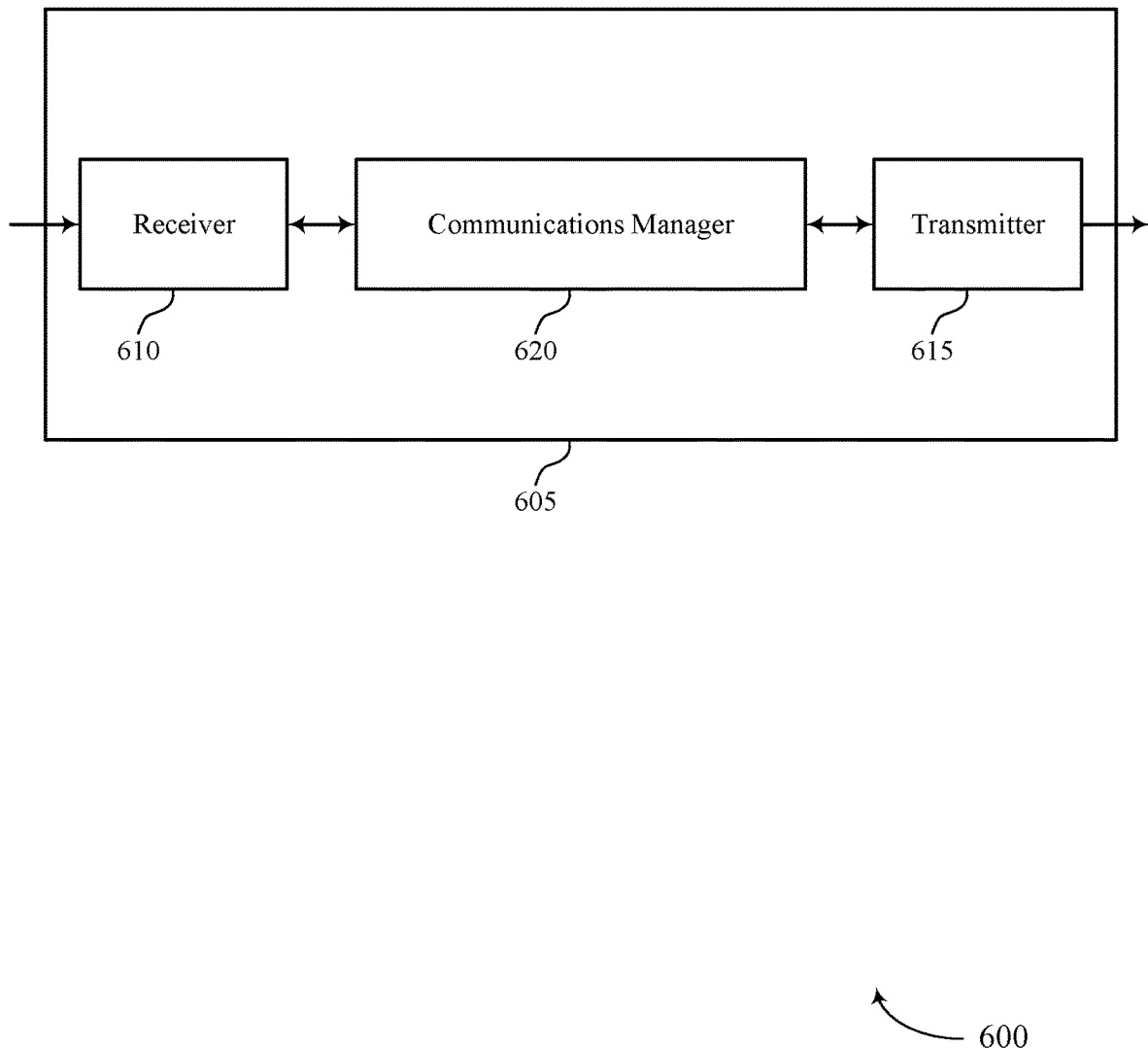
FIGS. 6 and 7 show block diagrams of devices that support transmit power adjustment based on IUC in accordance with one or more aspects of the present disclosure.

FIG. 6 shows a block diagram 600 of a device 605 that supports transmit power adjustment based on IUC in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmit power adjustment based on IUC). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmit power adjustment based on IUC). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of transmit power adjustment based on IUC as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. For example, the communications manager 620 may be configured as or otherwise support a means for receiving, by the first UE, first sidelink control information reserving a first set of resources for a first sidelink transmission by a third UE. The communications manager 620 may be configured as or otherwise support a means for transmitting, to a second UE, an IUC message indicating a second set of resources and an amount of transmit power reduction for the second UE to observe for a second sidelink transmission by the second UE via the second set of resources, where the second set of resources overlaps with the first set of resources. The communications manager 620 may be configured as or otherwise support a means for receiving the second sidelink transmission from the second UE via the second set of resources in accordance with the indicated amount of transmit power reduction or the first sidelink transmission from the third UE via the first set of resources.

Additionally, or alternatively, the communications manager 620 may support wireless communication at a second UE in accordance with examples as disclosed herein. For example, the communications manager 620 may be configured as or otherwise support a means for receiving, from a first UE, an IUC message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE. The communications manager 620 may be configured as or otherwise support a means for transmitting the second sidelink transmission via the second set of resources in accordance with the indicated amount of transmit power reduction.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources (e.g., because the described techniques may enable the device 605 or another device to use communication resources that the device 605 or the other device would otherwise avoid using).

Figure 7:
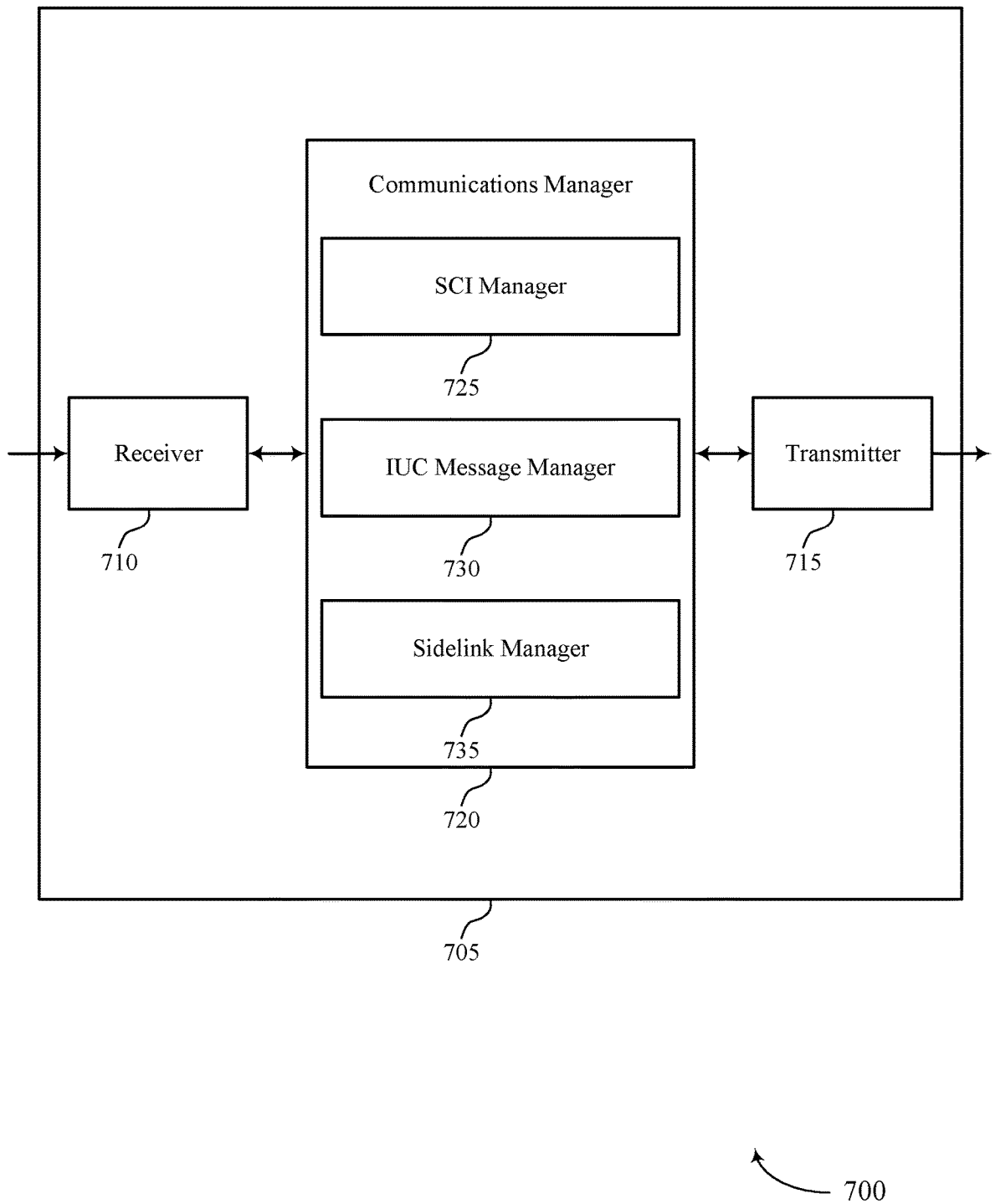

FIG. 7 shows a block diagram 700 of a device 705 that supports transmit power adjustment based on IUC in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmit power adjustment based on IUC). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmit power adjustment based on IUC). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of transmit power adjustment based on IUC as described herein. For example, the communications manager 720 may include an SCI manager 725, an IUC message manager 730, a sidelink manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. The SCI manager 725 may be configured as or otherwise support a means for receiving, by the first UE, first sidelink control information reserving a first set of resources for a first sidelink transmission by a third UE. The IUC message manager 730 may be configured as or otherwise support a means for transmitting, to a second UE, an IUC message indicating a second set of resources and an amount of transmit power reduction for the second UE to observe for a second sidelink transmission by the second UE via the second set of resources, where the second set of resources overlaps with the first set of resources. The sidelink manager 735 may be configured as or otherwise support a means for receiving the second sidelink transmission from the second UE via the second set of resources in accordance with the indicated amount of transmit power reduction or the first sidelink transmission from the third UE via the first set of resources.

Additionally, or alternatively, the communications manager 720 may support wireless communication at a second UE in accordance with examples as disclosed herein. The IUC message manager 730 may be configured as or otherwise support a means for receiving, from a first UE, an IUC message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE. The sidelink manager 735 may be configured as or otherwise support a means for transmitting the second sidelink transmission via the second set of resources in accordance with the indicated amount of transmit power reduction.

Figure 8:
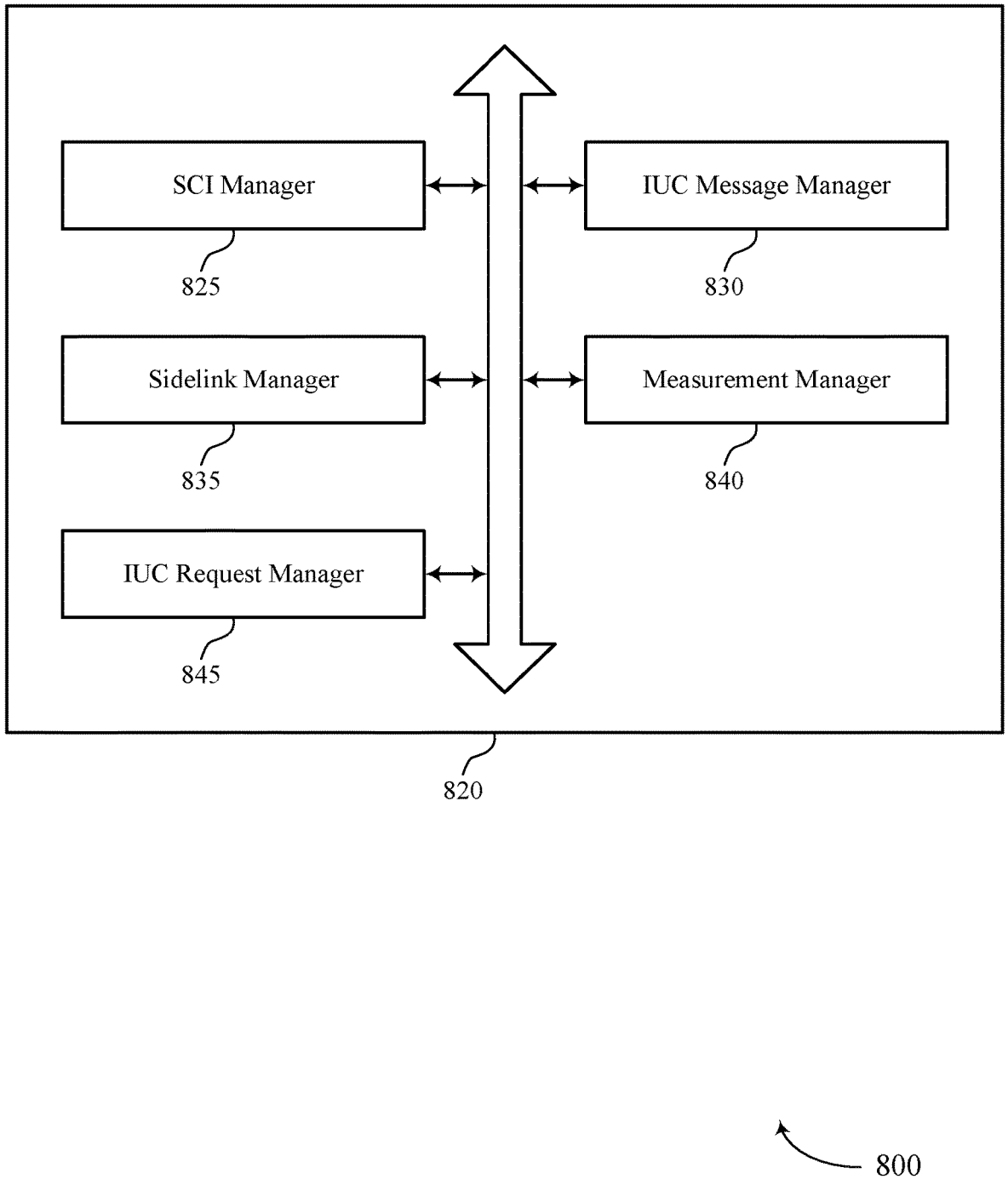
FIG. 8 shows a block diagram of a communications manager that supports transmit power adjustment based on IUC in accordance with one or more aspects of the present disclosure.

FIG. 8 shows a block diagram 800 of a communications manager 820 that supports transmit power adjustment based on IUC in accordance with one or more aspects of the present disclosure. The communications manager 820 may be an example of aspects of a communications manager 620, a communications manager 720, or both, as described herein. The communications manager 820, or various components thereof, may be an example of means for performing various aspects of transmit power adjustment based on IUC as described herein. For example, the communications manager 820 may include an SCI manager 825, an IUC message manager 830, a sidelink manager 835, a measurement manager 840, an IUC request manager 845, or any combination thereof. Each of these components may communicate, directly or indirectly, with one another (e.g., via one or more buses).

The communications manager 820 may support wireless communication at a first UE in accordance with examples as disclosed herein. The SCI manager 825 may be configured as or otherwise support a means for receiving, by the first UE, first sidelink control information reserving a first set of resources for a first sidelink transmission by a third UE. The IUC message manager 830 may be configured as or otherwise support a means for transmitting, to a second UE, an IUC message indicating a second set of resources and an amount of transmit power reduction for the second UE to observe for a second sidelink transmission by the second UE via the second set of resources, where the second set of resources overlaps with the first set of resources. The sidelink manager 835 may be configured as or otherwise support a means for receiving the second sidelink transmission from the second UE via the second set of resources in accordance with the indicated amount of transmit power reduction or the first sidelink transmission from the third UE via the first set of resources.

In some examples, to support transmitting the IUC message, the IUC message manager 830 may be configured as or otherwise support a means for transmitting a resource set type in the IUC message, the resource set type indicating that the second set of resources includes non-preferred resources.

In some examples, to support transmitting the IUC message, the IUC message manager 830 may be configured as or otherwise support a means for transmitting an indication that the IUC message indicates the amount of transmit power reduction for the second UE to observe for the second sidelink transmission by the second UE via the second set of resources.

In some examples, the IUC message includes second sidelink control information or a medium access control control element.

In some examples, the measurement manager 840 may be configured as or otherwise support a means for determining that a measurement performed on the first sidelink control information from the third UE fails to satisfy a threshold, where transmitting the IUC message to the second UE is based on the measurement failing to satisfy the threshold.

In some examples, to support transmitting the IUC message, the IUC message manager 830 may be configured as or otherwise support a means for transmitting the IUC message with a cyclic shift indicating the amount of transmit power reduction for the second UE to observe for the second sidelink transmission by the second UE via the second set of resources.

In some examples, the first UE is configured with a set of multiple cyclic shifts, and a first cyclic shift of the set of multiple cyclic shifts indicates that the second UE is to avoid transmitting the second sidelink transmission via the second set of resources, and each other cyclic shift of the set of multiple cyclic shifts indicates a different amount of transmit power reduction for the second UE to observe for the second sidelink transmission by the second UE via the second set of resources.

In some examples, the IUC message manager 830 may be configured as or otherwise support a means for determining to transmit the IUC message to the second UE based on the second sidelink transmission being associated with a lower priority than the first sidelink transmission.

In some examples, the SCI manager 825 may be configured as or otherwise support a means for receiving, by the first UE, signaling that reserves the second set of resources for the second sidelink transmission by the second UE.

In some examples, the first sidelink transmission from the third UE is intended for the first UE, and the measurement manager 840 may be configured as or otherwise support a means for determining that a first measurement performed on the signaling exceeds a first threshold or that a difference between the first measurement and a second measurement performed on the first sidelink control information exceeds a second threshold, where transmitting the IUC message to the second UE is based on the determining.

In some examples, the second sidelink transmission from the second UE is intended for the first UE, and the measurement manager 840 may be configured as or otherwise support a means for determining that a first measurement performed on the first sidelink control information exceeds a first threshold or that a difference between the first measurement and a second measurement performed on the signaling exceeds a second threshold, where transmitting the IUC message to the second UE is based on the determining.

Additionally, or alternatively, the communications manager 820 may support wireless communication at a second UE in accordance with examples as disclosed herein. In some examples, the IUC message manager 830 may be configured as or otherwise support a means for receiving, from a first UE, an IUC message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE. In some examples, the sidelink manager 835 may be configured as or otherwise support a means for transmitting the second sidelink transmission via the second set of resources in accordance with the indicated amount of transmit power reduction.

In some examples, to support receiving the IUC message, the IUC message manager 830 may be configured as or otherwise support a means for receiving a resource set type in the IUC message, the resource set type indicating that the second set of resources includes non-preferred resources.

In some examples, to support receiving the IUC message, the IUC message manager 830 may be configured as or otherwise support a means for receiving an indication that the IUC message indicates the amount of transmit power reduction for the second UE to observe for the second sidelink transmission by the second UE via the second set of resources.

In some examples, the IUC request manager 845 may be configured as or otherwise support a means for transmitting, to the first UE, a request for the IUC message, where receiving the IUC message from the first UE is based on transmitting the request.

In some examples, the IUC message includes second sidelink control information or a medium access control control element.

In some examples, to support receiving the IUC message, the IUC message manager 830 may be configured as or otherwise support a means for receiving the IUC message with a cyclic shift indicating the amount of transmit power reduction for the second UE to observe for the second sidelink transmission by the second UE via the second set of resources.

In some examples, the second sidelink transmission is associated with a lower priority than the first sidelink transmission. In some examples, receiving the IUC message is based on the second sidelink transmission being associated with a lower priority than the first sidelink transmission.

In some examples, the SCI manager 825 may be configured as or otherwise support a means for transmitting signaling that reserves the second set of resources for the second sidelink transmission by the second UE.

Figure 9:
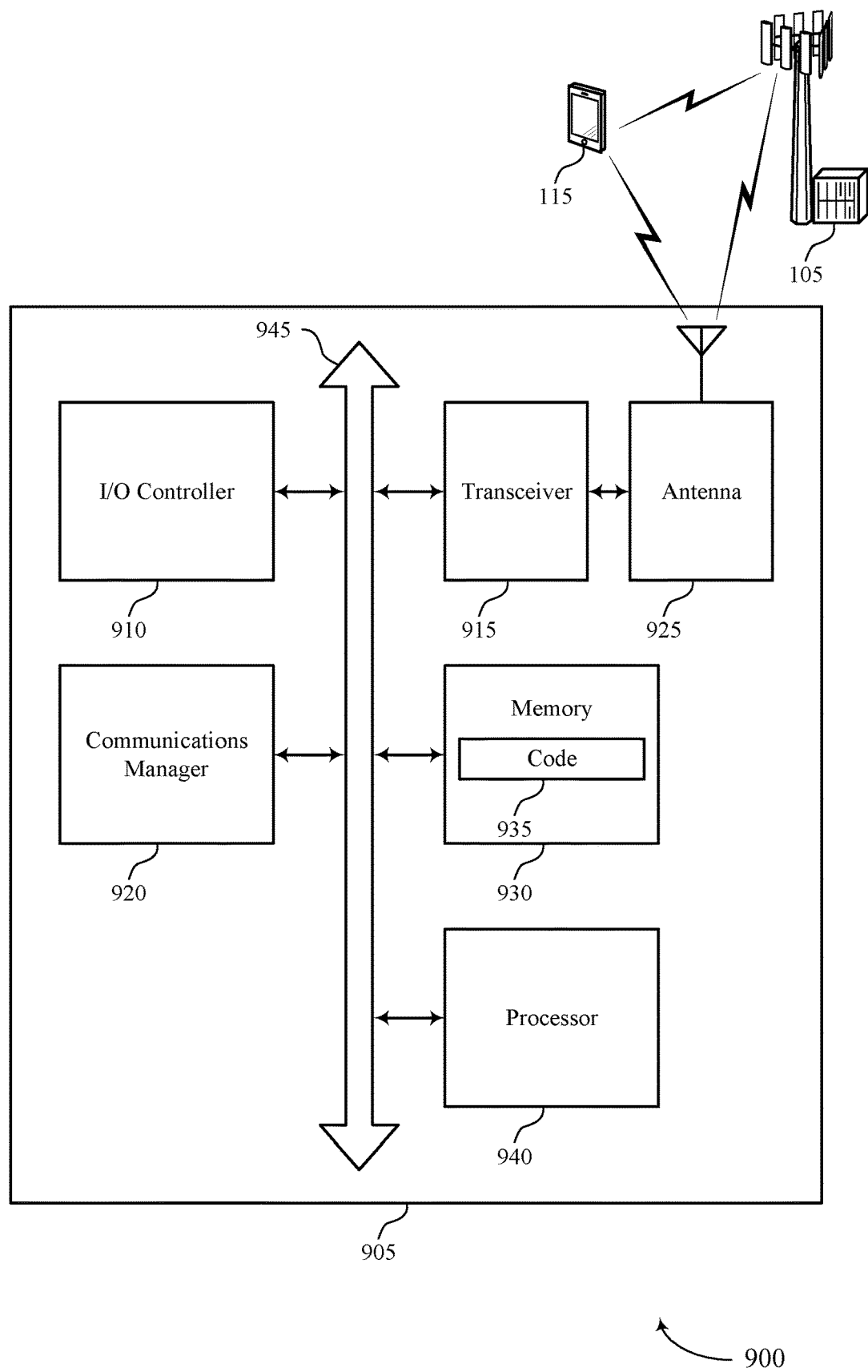
FIG. 9 shows a diagram of a system including a device that supports transmit power adjustment based on IUC in accordance with one or more aspects of the present disclosure.

FIG. 9 shows a diagram of a system 900 including a device 905 that supports transmit power adjustment based on IUC in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting transmit power adjustment based on IUC). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for receiving, by the first UE, first sidelink control information reserving a first set of resources for a first sidelink transmission by a third UE. The communications manager 920 may be configured as or otherwise support a means for transmitting, to a second UE, an IUC message indicating a second set of resources and an amount of transmit power reduction for the second UE to observe for a second sidelink transmission by the second UE via the second set of resources, where the second set of resources overlaps with the first set of resources. The communications manager 920 may be configured as or otherwise support a means for receiving the second sidelink transmission from the second UE via the second set of resources in accordance with the indicated amount of transmit power reduction or the first sidelink transmission from the third UE via the first set of resources.

Additionally, or alternatively, the communications manager 920 may support wireless communication at a second UE in accordance with examples as disclosed herein. For example, the communications manager 920 may be configured as or otherwise support a means for receiving, from a first UE, an IUC message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE. The communications manager 920 may be configured as or otherwise support a means for transmitting the second sidelink transmission via the second set of resources in accordance with the indicated amount of transmit power reduction.

By including or configuring the communications manager 920 in accordance with examples as described herein, the device 905 may support techniques for more efficient utilization of communication resources (e.g., because the described techniques may enable the device 905 or another device to use communication resources that the device 905 or the other device would otherwise avoid using).

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of transmit power adjustment based on IUC as described herein, or the processor 940 and the memory 930 may be otherwise configured to perform or support such operations.

Figure 10:
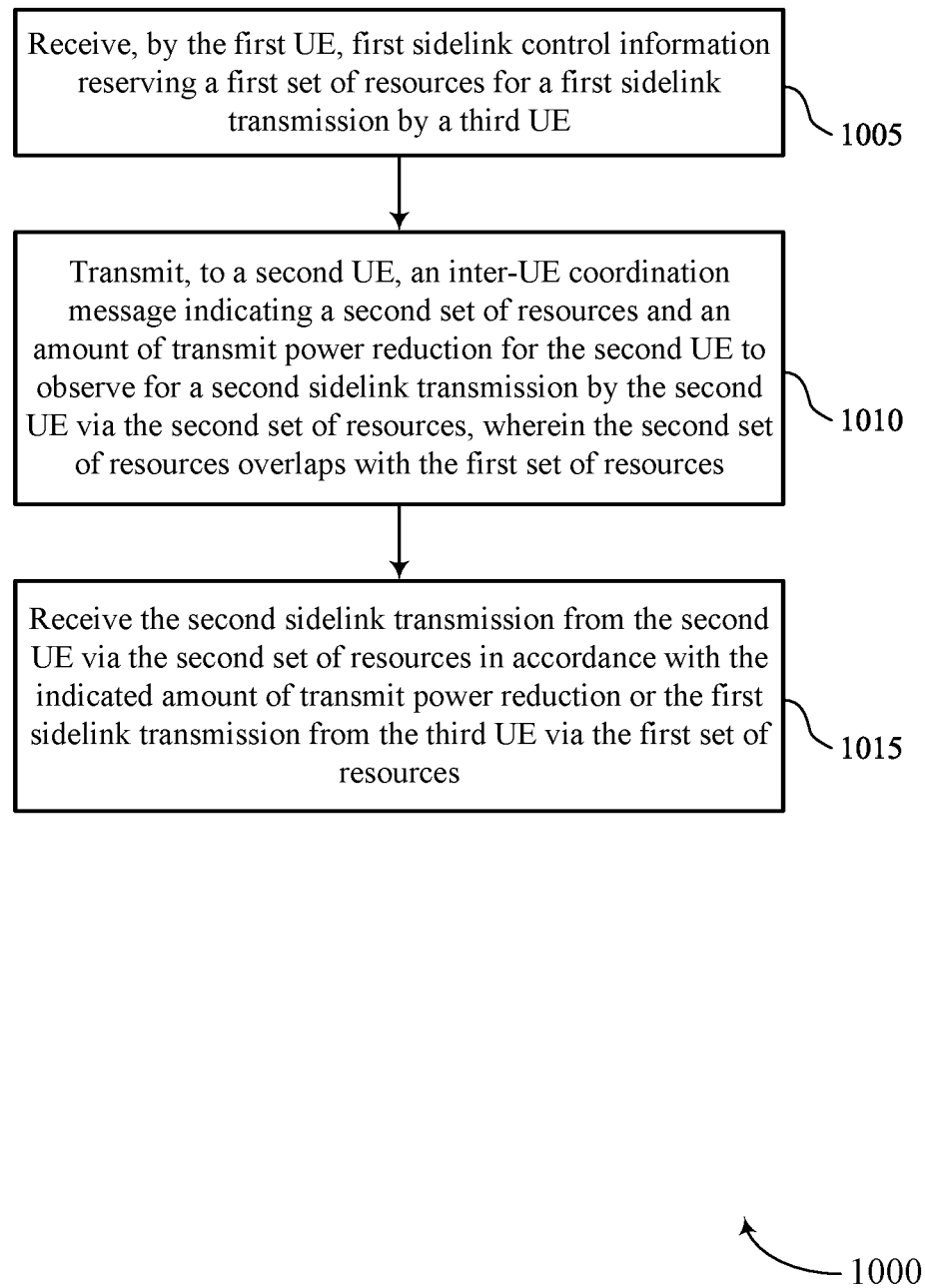
FIGS. 10 and 11 show flowcharts illustrating methods that support transmit power adjustment based on IUC in accordance with one or more aspects of the present disclosure.

FIG. 10 shows a flowchart illustrating a method 1000 that supports transmit power adjustment based on IUC in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, by the first UE, first sidelink control information reserving a first set of resources for a first sidelink transmission by a third UE. The operations of 1005 may be performed in accordance with examples as disclosed herein. In some examples, aspects of the operations of 1005 may be performed by an SCI manager 825 as described with reference to FIG. 8. Additionally, or alternatively, means for performing 1005 may, but not necessarily, include, for example, antenna 925, transceiver 915, communications manager 920, memory 930 (including code 935), processor 940, and/or bus 945.

At 1010, the method may include transmitting, to a second UE, an IUC message indicating a second set of resources and an amount of transmit power reduction for the second UE to observe for a second sidelink transmission by the second UE via the second set of resources, where the second set of resources overlaps with the first set of resources. The operations of 1010 may be performed in accordance with examples as disclosed herein. In some examples, aspects of the operations of 1010 may be performed by an IUC message manager 830 as described with reference to FIG. 8. Additionally, or alternatively, means for performing 1005 may, but not necessarily, include, for example, antenna 925, transceiver 915, communications manager 920, memory 930 (including code 935), processor 940, and/or bus 945.

At 1015, the method may include receiving the second sidelink transmission from the second UE via the second set of resources in accordance with the indicated amount of transmit power reduction or the first sidelink transmission from the third UE via the first set of resources. The operations of 1015 may be performed in accordance with examples as disclosed herein. In some examples, aspects of the operations of 1015 may be performed by a sidelink manager 835 as described with reference to FIG. 8. Additionally, or alternatively, means for performing 1005 may, but not necessarily, include, for example, antenna 925, transceiver 915, communications manager 920, memory 930 (including code 935), processor 940, and/or bus 945.

Figure 11:
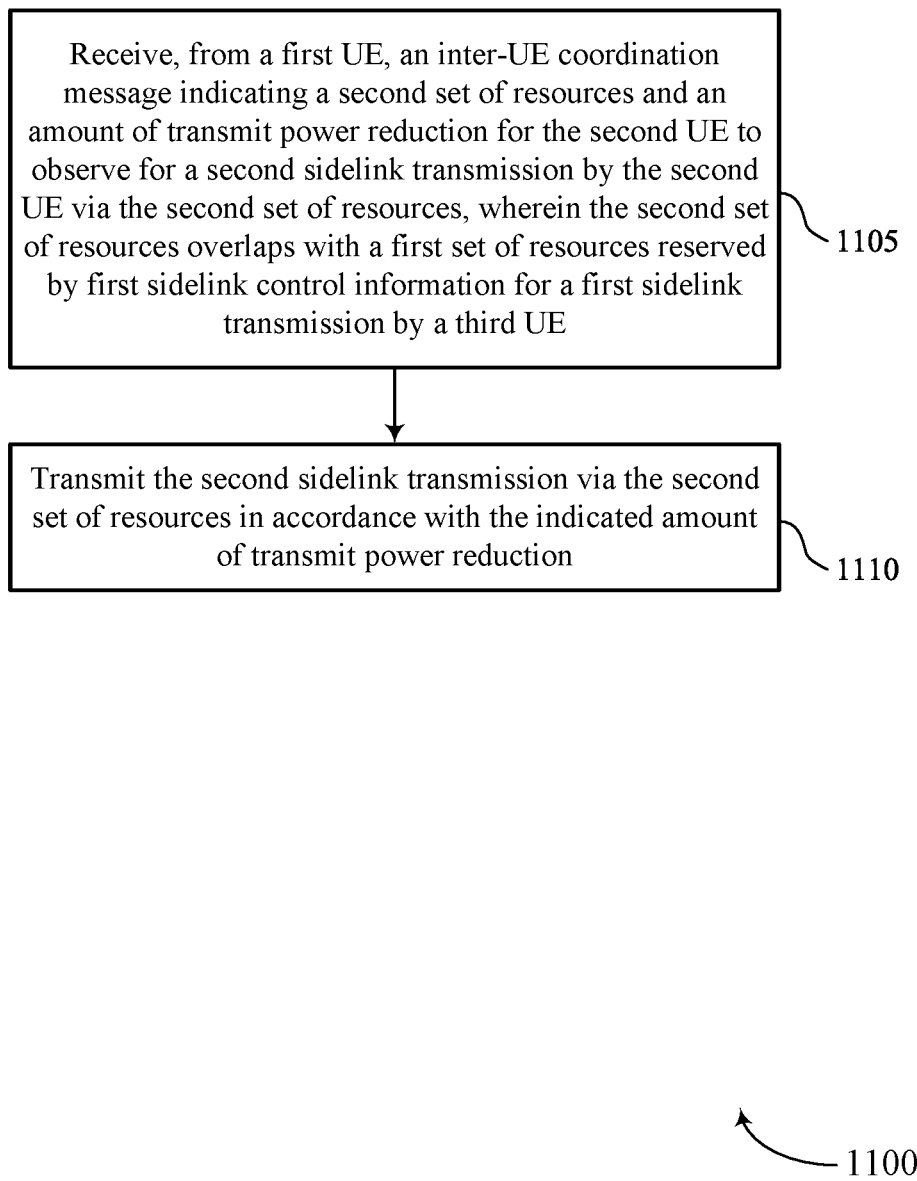

FIG. 11 shows a flowchart illustrating a method 1100 that supports transmit power adjustment based on IUC in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, from a first UE, an IUC message indicating a second set of resources and an amount of transmit power reduction for the second UE to observe for a second sidelink transmission by the second UE via the second set of resources, where the second set of resources overlaps with a first set of resources reserved by first sidelink control information for a first sidelink transmission by a third UE. The operations of 1105 may be performed in accordance with examples as disclosed herein. In some examples, aspects of the operations of 1105 may be performed by an IUC message manager 830 as described with reference to FIG. 8. Additionally, or alternatively, means for performing 1005 may, but not necessarily, include, for example, antenna 925, transceiver 915, communications manager 920, memory 930 (including code 935), processor 940, and/or bus 945.

At 1110, the method may include transmitting the second sidelink transmission via the second set of resources in accordance with the indicated amount of transmit power reduction. The operations of 1110 may be performed in accordance with examples as disclosed herein. In some examples, aspects of the operations of 1110 may be performed by a sidelink manager 835 as described with reference to FIG. 8. Additionally, or alternatively, means for performing 1005 may, but not necessarily, include, for example, antenna 925, transceiver 915, communications manager 920, memory 930 (including code 935), processor 940, and/or bus 945.

The following provides an overview of aspects of the present disclosure:

Aspect 1: A method for wireless communication at a first UE, comprising: receiving, by the first UE, first sidelink control information reserving a first set of resources for a first sidelink transmission by a third UE; transmitting, to a second UE, an inter-UE coordination message indicating a second set of resources and an amount of transmit power reduction for the second UE to observe for a second sidelink transmission by the second UE via the second set of resources, wherein the second set of resources overlaps with the first set of resources; and receiving the second sidelink transmission from the second UE via the second set of resources in accordance with the indicated amount of transmit power reduction or the first sidelink transmission from the third UE via the first set of resources.

Aspect 2: The method of aspect 1, wherein transmitting the inter-UE coordination message comprises: transmitting a resource set type in the inter-UE coordination message, the resource set type indicating that the second set of resources comprises non-preferred resources.

Aspect 3: The method of any of aspects 1 through 2, wherein transmitting the inter-UE coordination message comprises: transmitting an indication that the inter-UE coordination message indicates the amount of transmit power reduction for the second UE to observe for the second sidelink transmission by the second UE via the second set of resources.

Aspect 4: The method of any of aspects 1 through 3, wherein the inter-UE coordination message comprises second sidelink control information or a medium access control control element.

Aspect 5: The method of any of aspects 1 through 4, further comprising: determining that a measurement performed on the first sidelink control information from the third UE fails to satisfy a threshold, wherein transmitting the inter-UE coordination message to the second UE is based at least in part on the measurement failing to satisfy the threshold.

Aspect 6: The method of any of aspects 1 through 5, wherein transmitting the inter-UE coordination message comprises: transmitting the inter-UE coordination message with a cyclic shift indicating the amount of transmit power reduction for the second UE to observe for the second sidelink transmission by the second UE via the second set of resources.

Aspect 7: The method of any of aspects 1 through 6, wherein the first UE is configured with a plurality of cyclic shifts, and a first cyclic shift of the plurality of cyclic shifts indicates that the second UE is to avoid transmitting the second sidelink transmission via the second set of resources, and each other cyclic shift of the plurality of cyclic shifts indicates a different amount of transmit power reduction for the second UE to observe for the second sidelink transmission by the second UE via the second set of resources.

Aspect 8: The method of any of aspects 1 through 7, further comprising: determining to transmit the inter-UE coordination message to the second UE based at least in part on the second sidelink transmission being associated with a lower priority than the first sidelink transmission.

Aspect 9: The method of any of aspects 1 through 8, further comprising: receiving, by the first UE, signaling that reserves the second set of resources for the second sidelink transmission by the second UE.

Aspect 10: The method of aspect 9, wherein the first sidelink transmission from the third UE is intended for the first UE, the method further comprising: determining that a first measurement performed on the signaling exceeds a first threshold or that a difference between the first measurement and a second measurement performed on the first sidelink control information exceeds a second threshold, wherein transmitting the inter-UE coordination message to the second UE is based at least in part on the determining.

Aspect 11: The method of any of aspects 9 through 10, wherein the second sidelink transmission from the second UE is intended for the first UE, the method further comprising: determining that a first measurement performed on the first sidelink control information exceeds a first threshold or that a difference between the first measurement and a second measurement performed on the signaling exceeds a second threshold, wherein transmitting the inter-UE coordination message to the second UE is based at least in part on the determining.

Aspect 12: A method for wireless communication at a second UE, comprising: receiving, from a first UE, an inter-UE coordination message indicating a second set of resources and an amount of transmit power reduction for the second UE to observe for a second sidelink transmission by the second UE via the second set of resources, wherein the second set of resources overlaps with a first set of resources reserved by first sidelink control information for a first sidelink transmission by a third UE; and transmitting the second sidelink transmission via the second set of resources in accordance with the indicated amount of transmit power reduction.

Aspect 13: The method of aspect 12, wherein receiving the inter-UE coordination message comprises: receiving a resource set type in the inter-UE coordination message, the resource set type indicating that the second set of resources comprises non-preferred resources.

Aspect 14: The method of any of aspects 12 through 13, wherein receiving the inter-UE coordination message comprises: receiving an indication that the inter-UE coordination message indicates the amount of transmit power reduction for the second UE to observe for the second sidelink transmission by the second UE via the second set of resources.

Aspect 15: The method of any of aspects 12 through 14, further comprising: transmitting, to the first UE, a request for the inter-UE coordination message, wherein receiving the inter-UE coordination message from the first UE is based at least in part on transmitting the request.

Aspect 16: The method of any of aspects 12 through 15, wherein the inter-UE coordination message comprises second sidelink control information or a medium access control control element.

Aspect 17: The method of any of aspects 12 through 16, wherein receiving the inter-UE coordination message comprises: receiving the inter-UE coordination message with a cyclic shift indicating the amount of transmit power reduction for the second UE to observe for the second sidelink transmission by the second UE via the second set of resources.

Aspect 18: The method of any of aspects 12 through 17, wherein the second sidelink transmission is associated with a lower priority than the first sidelink transmission, and receiving the inter-UE coordination message is based at least in part on the second sidelink transmission being associated with a lower priority than the first sidelink transmission.

Aspect 19: The method of any of aspects 12 through 18, further comprising: transmitting signaling that reserves the second set of resources for the second sidelink transmission by the second UE.

Aspect 20: An apparatus comprising a memory, transceiver, and at least one processor of a first UE, the at least one processor coupled with the memory and the transceiver, and the at least one processor configured to perform a method of any of aspects 1 through 11.

Aspect 21: An apparatus for wireless communication at a first UE, comprising at least one means for performing a method of any of aspects 1 through 11.

Aspect 22: A non-transitory computer-readable medium storing code for wireless communication at a first UE, the code comprising instructions executable by a processor to perform a method of any of aspects 1 through 11.

Aspect 23: An apparatus comprising a memory, transceiver, and at least one processor of a second UE, the at least one processor coupled with the memory and the transceiver, and the at least one processor configured to perform a method of any of aspects 12 through 19.

Aspect 24: An apparatus for wireless communication at a second UE, comprising at least one means for performing a method of any of aspects 12 through 19.

Aspect 25: A non-transitory computer-readable medium storing code for wireless communication at a second UE, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, by the first UE, first sidelink control information reserving a first set of resources for a first sidelink transmission by a third UE; and
   transmitting, to a second UE, an inter-UE coordination message with a cyclic shift, wherein the inter-UE coordination message indicates a second set of resources and the cyclic shift indicates an amount of transmit power reduction for the second UE to observe for a second sidelink transmission by the second UE via the second set of resources, wherein the second set of resources overlaps with the first set of resources.

2. The method of claim 1, wherein transmitting the inter-UE coordination message comprises:
   transmitting a resource set type in the inter-UE coordination message, the resource set type indicating that the second set of resources comprises non-preferred resources.

3. The method of claim 1, wherein transmitting the inter-UE coordination message comprises:
   transmitting an indication that the inter-UE coordination message indicates the amount of transmit power reduction for the second UE to observe for the second sidelink transmission by the second UE via the second set of resources.

4. The method of claim 1, wherein the inter-UE coordination message comprises second sidelink control information or a medium access control control element.

5. The method of claim 1, further comprising:
   determining that a measurement performed on the first sidelink control information from the third UE fails to satisfy a threshold, wherein transmitting the inter-UE coordination message to the second UE is based at least in part on the measurement failing to satisfy the threshold.

6. The method of claim 1, wherein the first UE is configured with a plurality of cyclic shifts, and a first cyclic shift of the plurality of cyclic shifts indicates that the second UE is to avoid transmitting the second sidelink transmission via the second set of resources, and each other cyclic shift of the plurality of cyclic shifts indicates a different amount of transmit power reduction for the second UE to observe for the second sidelink transmission by the second UE via the second set of resources.

7. The method of claim 1, further comprising:
   determining to transmit the inter-UE coordination message to the second UE based at least in part on the second sidelink transmission being associated with a lower priority than the first sidelink transmission.

8. The method of claim 1, further comprising:
   receiving, by the first UE, signaling that reserves the second set of resources for the second sidelink transmission by the second UE.

9. The method of claim 8, wherein the first sidelink transmission from the third UE is intended for the first UE, the method further comprising:
   determining that a first measurement performed on the signaling exceeds a first threshold or that a difference between the first measurement and a second measurement performed on the first sidelink control information exceeds a second threshold, wherein transmitting the inter-UE coordination message to the second UE is based at least in part on the determining.

10. The method of claim 8, wherein the second sidelink transmission from the second UE is intended for the first UE, the method further comprising:
    determining that a first measurement performed on the first sidelink control information exceeds a first threshold or that a difference between the first measurement and a second measurement performed on the signaling exceeds a second threshold, wherein transmitting the inter-UE coordination message to the second UE is based at least in part on the determining.

11. An apparatus for wireless communication, comprising:
    memory;
    a transceiver; and
    at least one processor of a first user equipment (UE), the at least one processor coupled with the memory and the transceiver, and the at least one processor configured to cause the apparatus to:
    receive, by the first UE via the transceiver, first sidelink control information reserving a first set of resources for a first sidelink transmission by a third UE; and
    transmit, to a second UE via the transceiver, an inter-UE coordination message with a cyclic shift, wherein the inter-UE coordination message indicates a second set of resources and the cyclic shift indicates an amount of transmit power reduction for the second UE to observe for a second sidelink transmission by the second UE via the second set of resources, wherein the second set of resources overlaps with the first set of resources.

12. The apparatus of claim 11, wherein, to transmit the inter-UE coordination message, the at least one processor is configured to cause the apparatus to:

transmit, via the transceiver, a resource set type in the inter-UE coordination message, the resource set type indicating that the second set of resources comprises non-preferred resources.

13. The apparatus of claim 11, wherein, to transmit the inter-UE coordination message, the at least one processor is configured to cause the apparatus to:
transmit, via the transceiver, an indication that the inter-UE coordination message indicates the amount of transmit power reduction for the second UE to observe for the second sidelink transmission by the second UE via the second set of resources.

14. The apparatus of claim 11, wherein the inter-UE coordination message comprises second sidelink control information or a medium access control control element.

15. The apparatus of claim 11, wherein the at least one processor is further configured to cause the apparatus to:
determine that a measurement performed on the first sidelink control information from the third UE fails to satisfy a threshold, wherein the at least one processor is configured to cause the apparatus to transmit the inter-UE coordination message to the second UE based at least in part on the measurement failing to satisfy the threshold.

16. The apparatus of claim 11, wherein the first UE is configured with a plurality of cyclic shifts, and a first cyclic shift of the plurality of cyclic shifts indicates that the second UE is to avoid transmitting the second sidelink transmission via the second set of resources, and each other cyclic shift of the plurality of cyclic shifts indicates a different amount of transmit power reduction for the second UE to observe for the second sidelink transmission by the second UE via the second set of resources.

17. The apparatus of claim 11, wherein the at least one processor is further configured to cause the apparatus to:
determine to transmit the inter-UE coordination message to the second UE based at least in part on the second sidelink transmission being associated with a lower priority than the first sidelink transmission.

18. A non-transitory computer-readable medium storing code for wireless communication at a first user equipment (UE), the code comprising instructions executable by a processor to:
receive, by the first UE, first sidelink control information reserving a first set of resources for a first sidelink transmission by a third UE; and
transmit, to a second UE, an inter-UE coordination message with a cyclic shift, wherein the inter-UE coordination message indicates a second set of resources and the cyclic shift indicates an amount of transmit power reduction for the second UE to observe for a second sidelink transmission by the second UE via the second set of resources, wherein the second set of resources overlaps with the first set of resources.

* * * * *